United States Patent
Chan et al.

(10) Patent No.: US 11,273,931 B2
(45) Date of Patent: Mar. 15, 2022

(54) SENSOR BASED CONTROL OF SWAGE TOOLS

(71) Applicant: The Boeing Company, Chicago, IL (US)

(72) Inventors: Kwok Tung Chan, Seattle, WA (US); Tanni Sisco, Mukilteo, WA (US); Skye Jenkins, Everett, WA (US); Jeff Devlin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 206 days.

(21) Appl. No.: 16/140,202

(22) Filed: Sep. 24, 2018

(65) Prior Publication Data

US 2020/0094990 A1    Mar. 26, 2020

(51) Int. Cl.
| | |
|---|---|
| *B21J 15/14* | (2006.01) |
| *B21J 15/20* | (2006.01) |
| *B64F 5/10* | (2017.01) |
| *B21J 15/28* | (2006.01) |

(52) U.S. Cl.
CPC ............... *B64F 5/10* (2017.01); *B21J 15/142* (2013.01); *B21J 15/20* (2013.01); *B21J 15/28* (2013.01)

(58) Field of Classification Search
CPC ........ B21J 15/02; B21J 15/022; B21J 15/142; B21J 15/20; B21J 15/28; B21J 15/285; B64F 5/10; F16B 19/05; Y10T 29/49764; Y10T 29/49771; Y10T 29/49776
See application file for complete search history.

(56) References Cited

U.S. PATENT DOCUMENTS

| | | | |
|---|---|---|---|
| 1,901,431 A | 3/1933 | Bond et al. | |
| 3,036,576 A | 5/1962 | Lloyd | |
| 3,089,062 A | 5/1963 | Schulz | |
| 3,603,126 A * | 9/1971 | Newman | .................. B21J 15/18 |
| | | | 72/28.1 |
| 3,661,887 A | 5/1972 | Leebrick | |
| 4,901,431 A * | 2/1990 | Gast | ......................... B21J 15/32 |
| | | | 29/707 |
| 5,036,576 A * | 8/1991 | Gast | ......................... B21J 15/32 |
| | | | 29/407.01 |
| 5,315,755 A * | 5/1994 | Fulbright | ............... B21J 15/022 |
| | | | 29/709 |

(Continued)

FOREIGN PATENT DOCUMENTS

| | | |
|---|---|---|
| CN | 108296406 A | 7/2018 |
| DE | 102013112363 A1 | 5/2015 |

(Continued)

OTHER PUBLICATIONS

U.S. Appl. No. 15/923,297.

(Continued)

*Primary Examiner* — Jacob J Cigna
(74) *Attorney, Agent, or Firm* — Duft & Bornsen, PC

(57) ABSTRACT

Systems and methods are provided for inspecting installation of a fastener. One method includes monitoring hydraulic pressure of a tool that is installing the fastener, detecting that the hydraulic pressure has dropped by more than a threshold amount within a period of time, determining that a pintail of the fastener has snapped in response to the detecting, and reducing the hydraulic pressure in response to the determining.

20 Claims, 20 Drawing Sheets

(56) References Cited

U.S. PATENT DOCUMENTS

| | | | | |
|---|---|---|---|---|
| 5,502,884 | A * | 4/1996 | Ladouceur | B23P 19/062 29/407.05 |
| 5,661,887 | A * | 9/1997 | Byrne | B21J 15/105 227/2 |
| 6,089,062 | A * | 7/2000 | Zemp | B21J 9/20 72/17.2 |
| 6,256,854 | B1 * | 7/2001 | Chitty | B21J 15/043 29/243.53 |
| 6,347,449 | B1 * | 2/2002 | Calkins | B21J 15/285 29/701 |
| 7,055,393 | B2 | 6/2006 | Smith | |
| 7,503,196 | B2 | 3/2009 | Chitty et al. | |
| 7,802,352 | B2 * | 9/2010 | Chitty | B21J 15/28 29/524.1 |
| 10,483,901 | B2 * | 11/2019 | Woyciesjes | B21J 15/26 |
| 10,821,496 | B2 | 11/2020 | Chan et al. | |
| 2004/0060363 | A1 * | 4/2004 | Smith | B21J 15/285 73/849 |
| 2004/0063362 | A1 * | 4/2004 | Weeks | B21J 15/285 439/894 |
| 2006/0230591 | A1 * | 10/2006 | Chitty | B21J 15/285 29/243.523 |
| 2008/0168816 | A1 * | 7/2008 | Chitty | B21J 15/10 72/21.1 |
| 2018/0148196 | A1 | 5/2018 | Chan et al. | |
| 2019/0283113 | A1 | 9/2019 | Chan et al. | |
| 2019/0283114 | A1 | 9/2019 | Chan et al. | |
| 2021/0121941 | A1 * | 4/2021 | Dai | B21J 15/285 |

FOREIGN PATENT DOCUMENTS

| | | |
|---|---|---|
| EP | 0995518 B1 | 4/2000 |
| EP | 1302258 A1 | 4/2003 |
| EP | 1712311 A1 | 10/2006 |

OTHER PUBLICATIONS

U.S. Appl. No. 15/923,378.
U.S. Appl. No. 15/963,148.
European Search Report; Application EP19190789; dated Feb. 19, 2020.
European Office Action; Application 19190789.8; dated Mar. 9, 2021.

* cited by examiner

RETURN PRESSURE

SENSOR BASED CONTROL OF SWAGE TOOLS

FIELD

The disclosure relates to the field of fabrication, and in particular, to swage tools.

BACKGROUND

The number of fasteners (e.g., bolts) used to assemble aircraft can be astronomical. For example, a midsize commercial jetliner can have several million fasteners that are installed to join different parts together.

Furthermore, a technician must inspect the fasteners installed by an automated tool in order to ensure that work was performed properly. Inspection of the aforesaid millions of fasteners is a labor intensive process.

Therefore, it would be desirable to have a method and apparatus that take into account at least some of the issues discussed above, as well as other possible issues. For example, it would be desirable to have a method and apparatus that overcome a technical problem with automating the installation of fasteners.

SUMMARY

Embodiments described herein provide systems and methods which are capable of determining whether or not installation of a fastener has completed, based on pressure measurements for a hydraulic system that drives an automated installation tool. This provides a technical benefit because it allows the installation tool to halt operations early if hydraulic pressure readings indicate that installation has already completed for a fastener. Hence, the automated installation tools described herein may operate more quickly than prior systems when installing large numbers of fasteners because they do not need to wait for an expected maximum installation time. The systems described herein provide a further technical benefit in that they facilitate detection and reporting of successful and unsuccessful fastener installations.

One embodiment is a method for inspecting installation of a fastener. The method includes monitoring hydraulic pressure of a tool that is installing the fastener, detecting that the hydraulic pressure has dropped by more than a threshold amount within a period of time, determining that a pintail of the fastener has snapped in response to the detecting, and reducing the hydraulic pressure in response to the determining.

A further embodiment is a non-transitory computer readable medium embodying programmed instructions which, when executed by a processor, are operable for performing a method. The method includes monitoring hydraulic pressure of a tool that is installing the fastener, detecting that the hydraulic pressure has dropped by more than a threshold amount within a period of time, determining that a pintail of the fastener has snapped in response to the detecting, and reducing the hydraulic pressure in response to the determining.

A further embodiment is an apparatus for controlling hydraulic pressure at a swage tool. The apparatus includes a swage tool, a hydraulic system that drives the swage tool, a sensor that detects pressure changes over time in the hydraulic system, and a controller. In response to determining that pressure in the hydraulic system has decreased at a greater rate than a threshold rate during a swaging operation, the controller instructs a hydraulic motor of the hydraulic system to halt in response to confirming that swaging has completed based on additionally detected pressure changes, and awaits another determination that pressure in the hydraulic system has decreased at a greater rate than the threshold rate during the swaging operation in response to determining that the swaging operation has not completed based on additionally detected pressure changes.

A further embodiment is a method for controlling hydraulic pressure at a swage tool. The method includes detecting pressure changes over time in a hydraulic system that drives a swage tool; and in response to determining that pressure in the hydraulic system has decreased at a greater rate than a threshold rate during a swaging operation: instructing the hydraulic system to reduce pressure in response to confirming that the swaging operation has completed based on additionally detected pressure changes; and awaiting another determination that pressure in the hydraulic system has decreased at a greater rate than the threshold rate during the swaging operation in response to determining that the swaging operation has not completed based on additionally detected pressure changes.

Yet another embodiment is a system for controlling hydraulic pressure at a swage tool. The system includes a pressure sensor that monitors hydraulic pressure of a tool that is installing the fastener, and a controller which detects that the hydraulic pressure has dropped by more than a threshold amount within a period of time, determines that a pintail of the fastener has snapped in response to the detecting, and reduces the hydraulic pressure in response to the determining.

Still another embodiment is a method for inspecting installation of a fastener. The method includes monitoring hydraulic pressure of a tool that is installing the fastener, and arriving at a conclusion indicating a state of a fastener being installed, based on the hydraulic pressure.

Yet another embodiment is a method for controlling hydraulic pressure at a swage tool. The method includes detecting pressure changes over time in a hydraulic system that drives a tool; and in response to monitoring hydraulic pressure: instructing the hydraulic system to reduce pressure in response to confirming that a fastener has been fully installed by the tool based on additionally detected pressure changes; and awaiting another determination that pressure in the hydraulic system has decreased at a greater rate than the threshold rate in response to determining that the fastener has not been fully installed by the tool based on additionally detected pressure changes.

A still further embodiment is a system for controlling hydraulic pressure at a swage tool. The system includes a pressure sensor that monitors hydraulic pressure of a tool that is installing a fastener, and a controller that arrives at a conclusion indicating a state of a fastener being installed, based on the monitored hydraulic pressure.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The illustrative embodiments recognize and take into account one or more different considerations. For example, the illustrative embodiments recognize and take into account that a swage tool may take varying amounts of time to perform an installation of a fastener.

Thus, the illustrative embodiments provide a method, an apparatus, and a system for installing fasteners. In one illustrative example, a fastener installation system comprises a platform and an offset collar installer, although any suitable fastener installation system, including ones that are not offset, may be used. The platform is configured to be movably positioned on a structure. The offset collar installer is connected to the platform.

When one component is "connected" with another component, the connection is a physical association. For example, a first component, such as an offset collar installer, may be considered to be physically connected to a second component, such as a platform, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically connected to the second component by being formed as part of the second component, an extension of the second component, or both.

In the illustrative example, a controller dynamically halts application of hydraulic pressure to a swage tool, based on pressure sensor input indicating that swaging has completed.

Thus, the illustrative embodiments provide a method, an apparatus, and a system for reviewing sensor input to determine whether a fastener such as a collar and a pin has been successfully installed.

FIGS. 1-5 illustrate but one of countless automated fastener installation tools that may be monitored in accordance with the inventive processes described herein. Thus, FIGS. 1-5 shall be considered illustrative of just one of innumerable variations in tooling that may benefit from application of the inventive process.

Figure 1:
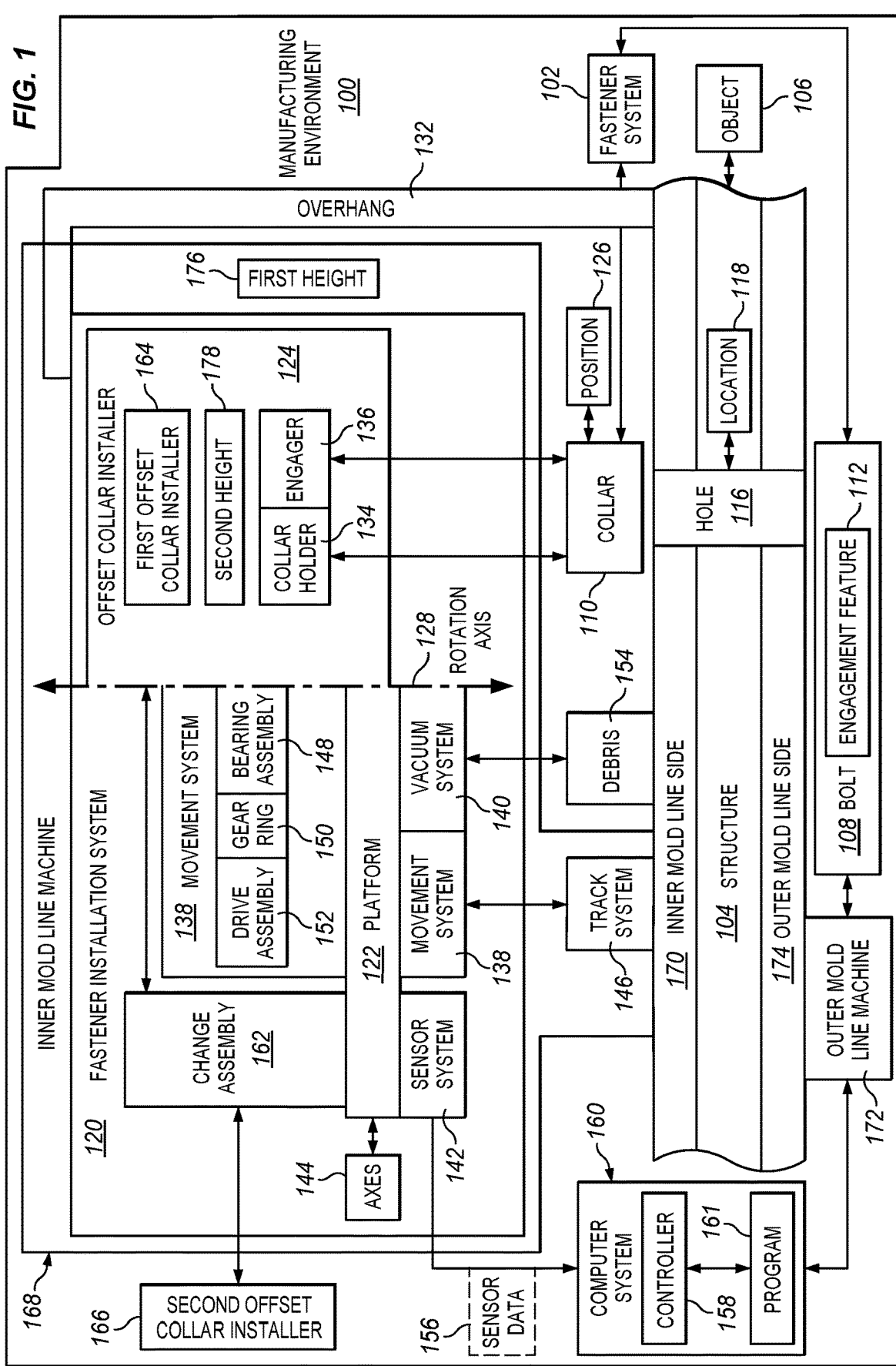
FIG. 1 is an illustration of a block diagram of a manufacturing environment in which a fastener installation system installs fasteners in accordance with an illustrative embodiment.

With reference now to the figures and, in particular, with reference to FIG. 1, an illustration of a block diagram of a manufacturing environment in which a fastener installation system installs fasteners is depicted in accordance with an illustrative embodiment. In this illustrative example, manufacturing environment 100 is an environment in which fastener 102 can be installed in structure 104 for object 106 by fastener installation system 120.

Fastener 102 includes bolt 108 and collar 110. In this illustrative example, bolt 108 can be selected from a group comprising a pin, the pin with a pin-tail, a threaded bolt, and a lock bolt.

As depicted, bolt 108 includes engagement feature 112. Engagement feature 112 can be, for example, a thread, a set of protrusions, a set of grooves, a flange, a set of annular grooves, or some other suitable type of feature that can be engaged by collar 110 and fasten collar 110 and bolt 108 to each other. Collar 110 can be selected from a group comprising a flanged collar, a threaded collar, a nut, and some other suitable structure that is configured to receive and be fastened to bolt 108.

Structure 104 can take a number of different forms. For example, structure 104 can be selected from a group comprising an assembly, a sub-assembly, a fuselage section, a wing, a wing box, a horizontal stabilizer, a landing gear system, a hydraulic system, a skin panel, a stringer, a fuselage section, a composite fuselage section, a support structure with a frame overhang, and some other structure in which fastener 102 can be installed to join two components to each other in structure 104.

Object 106 may take a number of different forms. For example, object 106 may be, for example, a mobile platform, a stationary platform, a land-based structure, an aquatic-based structure, and a space-based structure. More specifically, object 106 can be a surface ship, an aircraft, a tank, a personnel carrier, a train, a spacecraft, a space station, a satellite, a submarine, an automobile, a power plant, a bridge, a dam, a house, a manufacturing facility, a building, and other suitable types of objects.

As depicted, structure 104 includes hole 116 at location 118. In this illustrative example, fastener installation system 120 is configured to install fastener 102 in hole 116. In this illustrative example, fastener installation system 120 comprises platform 122 and offset collar installer 124.

During operation of fastener installation system 120, platform 122 is configured to be movably positioned on structure 104. Offset collar installer 124 is connected to platform 122. Offset collar installer 124 can hold collar 110 for installation in position 126 offset from rotation axis 128 and can fasten collar 110 to bolt 108 with engagement feature 112. As depicted, offset collar installer 124 can swing into position 126 offset from rotation axis 128. For example, offset collar installer 124 can rotate about rotation axis 128 to into position 126 offset from rotation axis 128 to install fastener 102 in hole 116.

In this illustrative example, overhang 132 may be such that all of fastener installation system 120 cannot move on structure 104 to fit under overhang 132. As depicted, offset collar installer 124 is configured to rotate around rotation axis 128 into position 126 offset in a manner that allows offset collar installer 124 to fit under overhang 132 such that collar 110 can be positioned and fastened to bolt 108 in hole 116. In other words, a portion of offset collar installer 124 can fit under overhang 132 or other restricted areas where other currently available collar installers in automated collar installation systems cannot fit.

In the illustrative example, fastener installation system 120 comprises collar holder 134 and engager 136. As depicted, collar holder 134 is configured to hold collar 110 in position 126 to receive bolt 108. In this example, collar 110 is stationary while bolt 108 moves through hole 116. In another illustrative example, bolt 108 is stationary in hole 116 while collar 110 moves towards hole 116 to receive bolt 108.

Engager 136 configured to fasten collar 110 to bolt 108. For example, engager 136 may swage collar 110 to bolt 108 such that collar 110 is fastened to bolt 108. In another illustrative example, engager 136 can rotate collar 110 relative to bolt 108 to fasten collar 110 to bolt 108. As depicted, collar holder 134 and engager 136 form offset collar installer 124.

In this illustrative example, fastener installation system 120 includes a number of other components. For example, fastener installation system 120 also includes movement system 138, vacuum system 140, and sensor system 142.

As depicted, movement system 138 is connected to platform 122. Movement system 138 can be configured to move at least one of platform 122 or offset collar installer 124.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

For example, movement system 138 is connected to offset collar installer 124 and is configured to move offset collar installer 124 around rotation axis 128. Further, movement system 138 is further configured to move platform 122 along axes 144 and in addition to moving offset collar installer 124 around rotation axis 128.

In one illustrative example, movement system 138 can be coupled to or placed on track system 146. As depicted, the movement along axes 144 can be relative to track system 146. Axes 144 can be, for example, two axes, three axes, or some other number of axes depending on the particular implementation. In this illustrative example, platform 122 is configured to move on track system 146, which is selected from at least one of a flexible track system, a dual track system, a flexible vacuum track system configured to be attached to structure 104, or some other suitable type.

In another illustrative example, movement system 138 can move offset collar installer 124 about rotation axis 128 using a number of different components. As depicted, these components in movement system 138 include bearing assembly 148, gear ring 150, and drive assembly 152.

As depicted, bearing assembly 148 is connected to offset collar installer 124. Bearing assembly 148 is configured to move around rotation axis 128. Gear ring 150 is connected to bearing assembly 148. Drive assembly 152 is moveably connected to gear ring 150. In this illustrative example, drive assembly 152 is configured to move gear ring 150. As a result, movement of drive assembly 152 moves bearing assembly 148 via gear ring 150.

In this illustrative example, vacuum system 140 is connected to platform 122. Vacuum system 140 is configured to remove debris 154 around hole 116. The debris can be, for example, particles generated from drilling the hole 116. In another example, when bolt 108 takes the form of a pin with a pin tail, debris 154 can include the pin tail that separates from the pin after swaging the collar to the pin. For example, when bolt 108 is a pin with a pin tail, a pin tail deflector (not shown) can guide the pin tail to a port (not shown) in vacuum system 140 after the pin tail is separated from the pin.

In this illustrative example, sensor system 142 is also connected to platform 122. As depicted, sensor system 142 is a physical hardware system that detects information about the environment around fastener installation system 120.

Sensor system 142 is configured to generate sensor data 156. Sensor data 156 can include information about structure 104, a position of offset collar installer 124, a position of platform 122 relative to structure 104, an image of hole 116, and other information that can be used to control the operation of fastener installation system 120. Sensor system 142 can include at least one of a camera system, a laser sensor, an ultrasonic sensor, a light detection and ranging scanner, or some other suitable type of sensor.

Sensor data 156 is sent to controller 158 located in computer system 160. Controller 158 can be implemented in at least one of software or hardware. When software is used, the operations performed by controller 158 may be implemented in program code configured to run on hardware, such as a processor unit. When firmware is used, the operations performed by controller 158 may be implemented in program code and data and stored in persistent memory to run on a processor unit. When hardware is employed, the hardware may include circuits that operate to perform the operations in controller 158.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Computer system 160 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

Controller 158 controls the operation of fastener installation system 120 utilizing program 161. Program 161 may be, for example, a computer numerical control (CNC) program or some other suitable program code that may be used to control the operation of fastener installation system 120. For example, fastener installation system 120 can be a computer numerical control (CNC) machine which uses cartesian coordinates.

Controller 158 can utilize sensor data 156 to control the operation of different components in fastener installation system 120. Although shown as a separate component, controller 158 and computer system 160 may be located on or in platform 122 in some illustrative examples.

Further, fastener installation system 120 can also include change assembly 162 that is connected to platform 122. In this example, offset collar installer 124 is first offset collar installer 164 and is connected to platform 122 indirectly through a connection to change assembly 162. First offset collar installer 164 is removably connected to change assembly 162. As a result, first offset collar installer 164 can be replaceable with second offset collar installer 164 without utilizing a tool (not shown). Different offset collar installers may be configured to install at least one of different sizes or different configurations of fasteners. In other words, a quick change can be made between offset collar installers to install fasteners of different sizes.

Further, platform 122, offset collar installer 124, movement system 138, vacuum system 140, and sensor system 142 form an inner mold line machine 168 located on inner mold line side 170 of structure 104 in this illustrative example. Further, fastener installation system 120 also can include outer mold line machine 172 configured to insert bolt 108, such as a pin, through hole 116 from outer mold line side 174 of structure 104. In this illustrative example, outer mold line machine 172 also can be controlled by controller 158 in computer system 160 to perform a coordinated installation of fastener 102 in hole 116 in structure 104.

In one illustrative example, one or more technical solutions are present that overcome a technical problem with installing fasteners via an automated tool. In the illustrative example, a swage tool may take a varying amount of time to install a fastener.

As a result, one or more technical solutions may provide a technical effect controlling swaging operations based on input from a pressure sensor at a swage tool in an illustrative embodiment.

Figure 2:
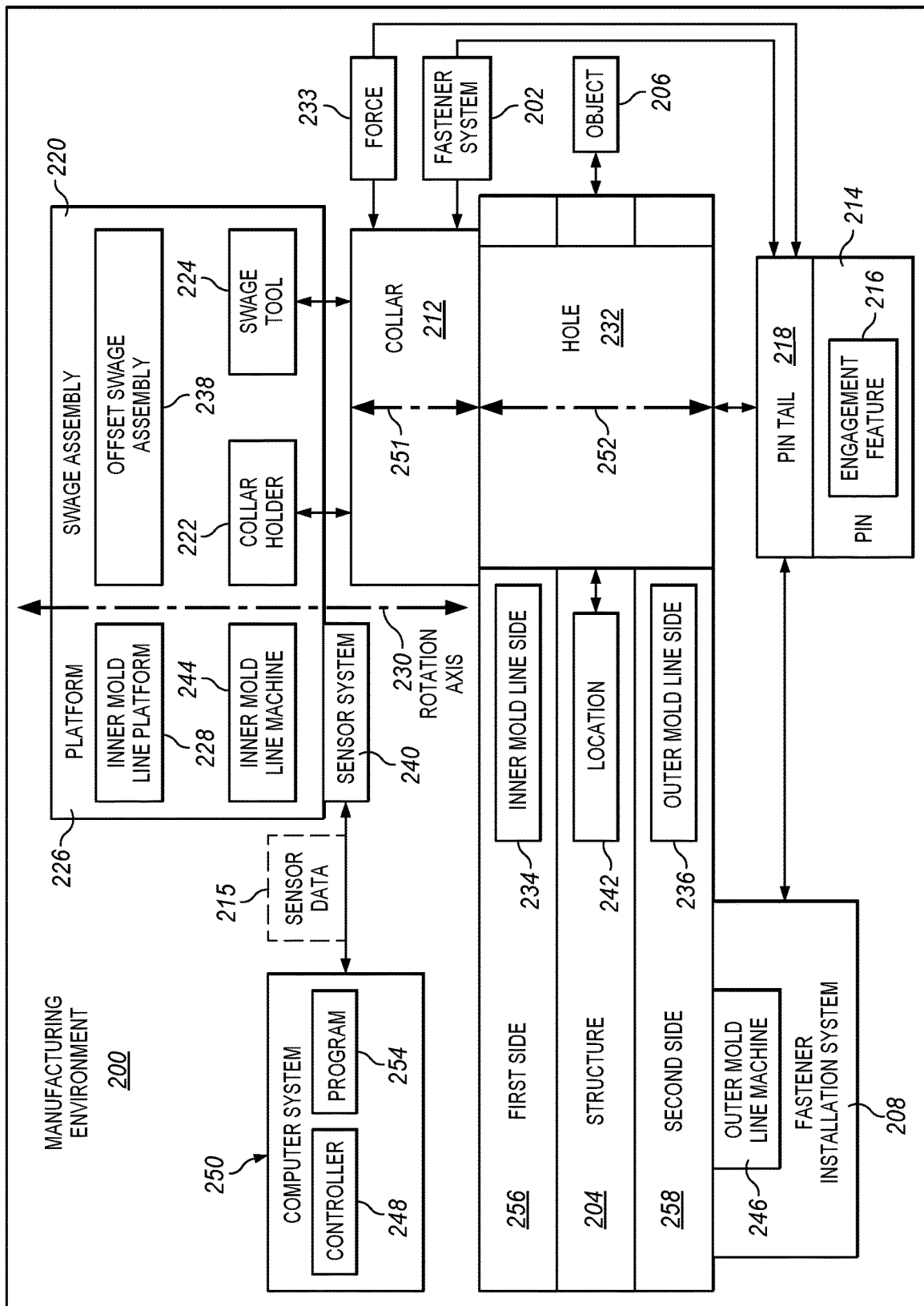
FIG. 2 is an illustration of a block diagram of a manufacturing environment in which a fastener is installed in accordance with an illustrative embodiment.

With reference next to FIG. 2, an illustration of a block diagram of a manufacturing environment in which a fastener is installed is depicted in accordance with an illustrative embodiment. Manufacturing environment 200 is an environment in which fastener 202 can be installed in structure 204 for object 206 utilizing fastener installation system 208. Structure 204 and object 206 may take various forms similar to the forms described with respect to structure 104 and object 106 in FIG. 1. Structure 204 can be, for example, without limitation, comprising a metal structure, composite structure, a metal and composite work piece, a splice, a butt splice, a splice for two fuselage sections, or some other suitable structure.

As depicted, fastener 202 comprises pin 214 and collar 212. In this illustrative example, collar 212 can be swaged to pin 214. In other words, collar 212 can be deformed to engage engagement feature 216 on pin 214. Pin 214 also may include pin tail 218. In this illustrative example, engagement feature 216 may be, for example, a thread, a set of protrusions, a set of grooves, a flange, or some other suitable type of feature that can be engaged by collar 212 and fasten collar 212 to pin 214.

As depicted, fastener installation system 208 comprises swage assembly 220, which is configured to cause collar 212 to engage with pin 214. In this illustrative example, swage assembly 220 is an example of offset collar installer 124 in FIG. 1 and comprises collar holder 222 and swage tool 224. Collar holder 222 is configured to hold collar 212. Swage tool 224 is configured to cause collar 212 to engage engagement feature 216 on pin 214. In this example, pin 214 and pin tail 218 are inserted into collar 212. In other words, pin 214 and pin tail 218 are moved through collar 212 after collar 212 has been positioned on hole 232.

Pin tail 218 is a component connected to pin 214. In this particular example, swage tool 224 engages pin tail 218 and pulls pin 214 through collar 212 in a manner that causes collar 212 to deform in a manner that engages engagement feature 216. Engagement feature 216 is a feature on pin 214 and not pin tail 218. Engagement feature 216 can be at least one of a set of threads, a set of grooves, a set of annular grooves, or other types of features to which collar 212 can be swaged to engage pin 214.

In the illustrative example, causing collar 212 to engage engagement feature 216 can be performed any number of different ways. For example, force 233 can be applied on at least one of collar 212 or pin tail 218 along centerline 251 extending centrally though collar 212 until pin tail 218 become separated from pin 214 such that collar 212 engages engagement feature 216 on pin 214 when pin 214 with pin tail 218 is inserted into hole 232 from second side 258. In other words, force 233 can be applied to one or both of collar 212 or pin tail 218 causing collar 212 to be swaged such that collar 212 engages engagement feature 216 on pin 214.

In this illustrative example, swage assembly 220 can be offset collar installer 124 in FIG. 1. Collar holder 222 can be an example of collar holder 134 in FIG. 1 and swage tool 224 can be an example of engager 136 in FIG. 1.

As depicted, swage assembly 220 is connected to platform 226. In this illustrative example, platform 226 takes the form of inner mold line platform 228. In this illustrative example, inner mold line platform 228 can be selected from a group comprising a flex track crawler, a robotic arm, and some other suitable type of platform.

In one example, swage assembly 220 is offset from swage assembly 238 such that collar 212 is held offset from rotation axis 230 on which swage assembly 220 is located. Depending on the implementation, swage assembly 220 may or may not be offset from rotation axis 230.

As depicted, collar holder 222 in swage assembly 220 is configured to position collar 212 on hole 232. In the illustrative example, the positioning is performed such that collar 212 is concentrically aligned with hole 232. For example, centerline 251 for collar 212 intercepts centerline 252 for hole 232.

In the illustrative examples, the positioning of collar 212 on hole 232 is performed such that collar 212 receives pin 214 when pin 214 is placed into hole 232 on inner mold line side 234 of structure 204 prior to insertion of pin 214 into hole 232 from outer mold line side 236. As depicted, pin 214 be moved in a single motion through hole 232 and collar 212.

When pin 214 is inserted into hole 232, outer mold line side 236 is moved to extend through collar 212, and swage assembly 220 swages the collar 212 such that collar 212 engages engagement feature 216 on pin 214.

As depicted, positioning of collar 212 on hole 232 may result in collar 212 touching the inner mold line side 234. In other illustrative examples, collar 212 may not touch inner mold line side 234 when being positioned on hole 232. In this example, swage tool 224 engages and pulls pin tail 218 such that pin tail 218 and pin 214 moves through collar 212 in a manner that causes collar 212 to swage to engage engagement feature 216 on pin 214.

In positioning the collar 212 on hole 232 on first side 256 of structure 204 prior to insertion of pin 214 into hole 232 from second side 258, swage assembly 220 holds collar 212 in collar holder 222 in swage assembly 220 and moves collar 212 such that collar 212 is positioned on hole 232 on inner mold line side 234 of structure 204. In this illustrative example, first side 256 is inner mold line side 234 and second side 258 is outer mold line side 236.

In another example, in positioning the collar 212 on hole 232 on inner mold line side 234 of structure 204 prior to insertion of pin 214 into hole 232 from outer mold line side 236, swage assembly 220 normalizes collar 212 to inner mold line side 234 and moves collar 212 onto hole 232 on inner mold line side 234 of structure 204 prior to insertion of pin 214 into hole 232 from outer mold line side 236. The normalization includes moving collar 212 about on one or more axes. This movement is performed in this example to provide concentricity between collar 212 and hole 232.

Further, fastener 202 also may include sensor system 240 similar to sensor system 142 in FIG. 1. In positioning the collar 212 on hole 232, sensor system 240 identifies location 242 of hole 232 on inner mold line side 234 and swage assembly 220 moves collar 212 onto hole 232 at location 242 on inner mold line side 234 of structure 204 prior to insertion of pin 214 into hole 232 from outer mold line side 236. As depicted, collar 212 is positioned such that concentricity is present between collar 212 and hole 232. This concentricity enables pin 214 to extend through collar 212 such that collar 212 can be fastened to pin 214.

In the illustrative example, sensor system 142 is a physical hardware system that detects information about the environment around fastener installation system 208. Sensor system 240 is configured to generate sensor data 215. Sensor system 240 can contain one or more types of sensors. For example, sensor system 240 can be selected from at least one of a camera system, a vision system, a laser range finder, or some other suitable type of sensor. Sensor data 215 generated by sensor system 240 can be used to perform alignment of collar 212 with hole 232. This alignment is performed to generate concentricity between collar 212 on hole 232 such that pin tail 218 and pin 214 can be inserted through hole 232 and extends through collar 212 in a desired manner.

In this illustrative example, swage assembly 220 and platform 226 form the inner mold line machine 244. Further, fastener installation system 208 also includes outer mold line machine 246 in this illustrative example. Outer mold line machine 246 is configured to insert pin 214 through hole 232 from outer mold line side 236 of structure 204. As depicted, collar 212 is aligned with hole 232 on inner mold line side 234 prior to pin tail 218 and pin 214 being moved through hole 232 to extend though collar 212.

In this illustrative example, inner mold line machine 244 and outer mold line machine 246 can be controlled by controller 248 in computer system 250 to perform a coordinated installation of fastener 202 in hole 232 in structure 204.

Sensor data 215 is sent to controller 248 located in computer system 250. Controller 248 can be implemented in at least one of software or hardware. When software is used, the operations performed by controller 248 may be implemented in program code configured to run on hardware, such as a processor unit. When firmware is used, the operations performed by controller 248 may be implemented in program code and data and stored in persistent memory to run on a processor unit. When hardware is employed, the hardware may include circuits that operate to perform the operations in controller 248.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Computer system 250 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

Controller 248 controls the operation of fastener installation system 208 utilizing program 254. Program 254 may be, for example, a computer numerical control (CNC) program or some other suitable program code that may be used to control the operation of fastener installation system 208.

Controller 248 can utilize sensor data 215 to control the operation of different components in fastener installation system 208. Although shown as a separate component, controller 248 and computer system 250 may be located on or in platform 226 in some illustrative examples.

In one illustrative example, fastener installation system 208 comprises collar holder 222, sensor system 240, and controller 248. In this example, collar holder 222 is configured to hold collar 212 in fastener 202. Sensor system 240 is configured to generate sensor data 215 for first side 256 of structure 204. As depicted in this example, controller 248 controls operation of sensor system 240 and collar holder 222. Controller 248 identifies location 242 of hole 232 in first side 256 of structure 204 using sensor data 215 and automatically positions the collar 212 held by collar holder 222 on hole 232 at location 242 by moving collar holder 222.

In one illustrative example, one or more technical solutions are present that overcome a technical problem with automating the installation of fasteners. Currently, automated installation processes have varying completion times, which causes these processes to be performed based on worst-case scenarios for completion times.

The illustrative embodiments recognize and take into account that currently employed machines such as those that move on rails attached to structure 204 may have to be manually inspected upon completion of fastener installation.

The illustrative examples provide a technical solution in which measured pressure of a hydraulic system is utilized in order to determine the completion time of a swaging operation.

As a result, a technical solution in the illustrative example may have a technical effect of saving time by enabling a swage tool to move on to a next swaging operation immediately in response to detecting completion of an earlier swaging operation.

The illustrations of manufacturing environment 100 in FIG. 1 and manufacturing environment 200 in FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, offset collar installer 124, movement system 138, vacuum system 140, and sensor system 142 have been described as being capable of forming the inner mold line machine 168 located on inner mold line side 170 of structure 104. In other illustrative examples, these components may be part of an outer mold line machine with the inner mold line machine inserting the bolt 108 from inner mold line side 170 of structure 104. As another example, first side 256 could be outer mold line side 236 while second side 258 could be inner mold line side 234 in other implementations.

Figure 3:
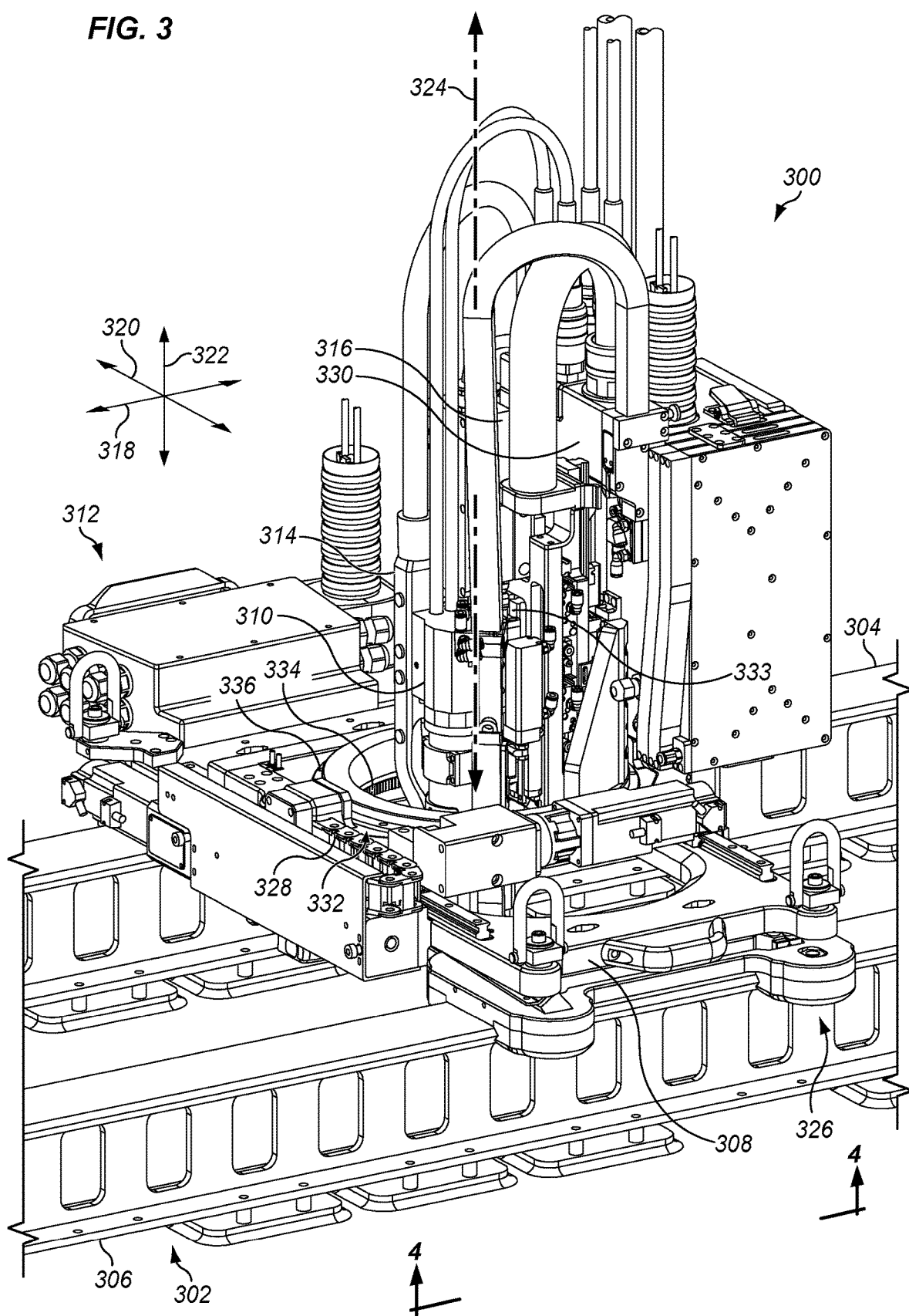
FIG. 3 is an illustration of an inner mold line machine in a fastener installation system in accordance with an illustrative embodiment.

With reference to FIG. 3, an illustration of inner mold line machine 300 in a fastener installation system is depicted in accordance with an illustrative embodiment. In this illustrative example, inner mold line machine 300 moves on track system 302. Track system 302 comprises first track 304 and second track 306.

As depicted, inner mold line machine 300 is an example of one implementation for inner mold line machine 168 in fastener installation system 120. As depicted, inner mold line machine 300 comprises platform 308, offset swage assembly 310, movement system 312, vacuum system 314, and camera 316. In this illustrative example, platform 308 is an example of one implementation for platform 122 shown in block form in FIG. 1. Offset swage assembly 310 is an example of an implementation for offset collar installer 124 depicted in block form in FIG. 1. Vacuum system 314 is an example of an implementation for vacuum system 140 shown in block form in FIG. 1. Camera 316 is an example of an implementation for sensor system 142 shown in block form in FIG. 1.

As depicted, movement system 312 is configured to move inner mold line machine 300 in a number of different directions. For example, movement system 312 is configured to move platform 308 in the direction of x-axis 318, y-axis 320, and z-axis 322.

Further, movement system 312 is also configured to move offset swage assembly 310 about rotation axis 324. In other words, movement system 312 can cause offset swage assembly 310 to swing around rotation axis 324. Rotation axis 324 is parallel to z-axis 322 in this illustrative example.

As depicted, motorized wheel system 326 is configured to move platform 308 along x-axis 318. Ball screw drive 328 is configured to move platform 308 along y-axis 320. Ball screw drive 330 is configured to move platform 308 along z-axis 322.

As depicted, movement system 312 is configured to move offset swage assembly 310 about rotation axis 324 with bearing assembly 332. In this view, gear ring 334 and outer ring 336 are seen in bearing assembly 332.

In this figure, offset swage assembly 310 is connected to gear ring 334 in bearing assembly 332. As depicted, gear ring 334 rotates about rotation axis 324 in this example. Outer ring 336 is connected to platform 308 and gear ring 334 is configured to rotate within outer ring 336. Further, vacuum system 314 and camera 316 are also connected to bearing assembly 332 such that these components also can be rotated about rotation axis 324. In this example, offset swage assembly 310 is removably attached to platform 308 by adapter 333.

Figure 4:
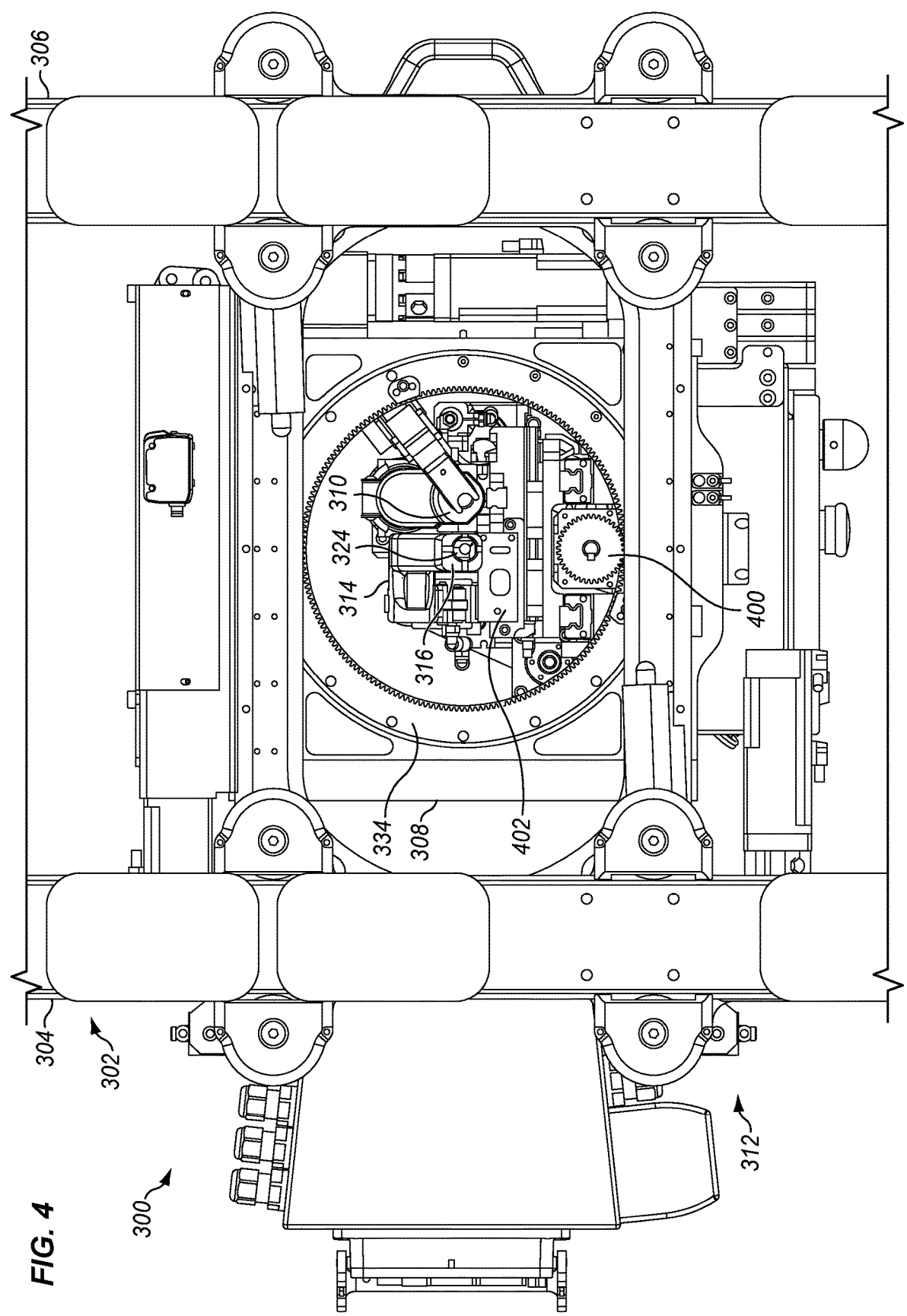
FIG. 4 is an illustration of a bottom view of an inner mold line machine in accordance with an illustrative embodiment.

With reference next to FIG. 4, an illustration of a bottom view of inner mold line machine 300 is depicted in accordance with an illustrative embodiment. In this example, inner mold line machine 300 as seen from a bottom view in the direction of lines 4-4 in FIG. 3.

As depicted in this example, movement system 312 is configured to move offset swage assembly 310 about rotation axis 324 with bearing assembly 332.

As depicted, gear ring 334 is connected to platform 308. As depicted, gear ring 334 is moveably connected to platform 308.

In this illustrative example, offset swage assembly 310, vacuum system 314, and camera 316 are shown as connected to gear ring 334. In other words, these components are configured to rotate around rotation axis 324 as gear ring 334 rotates about rotation axis 324. The different components may be directly or indirectly connected to gear ring 334.

As depicted, drive 400 is a motorized unit configured to cause offset swage assembly 310, vacuum system 314, and camera 316 to rotate around rotation axis 324 by moving gear ring 334.

In this illustrative example, laser sensor 402 is adjacent to camera 316. Laser sensor 402 detects the distance from laser sensor 402 to an inner mold line surface (not shown).

In this example, bearing assembly 332 with gear ring 334, outer ring 336, and drive 400 allows for 360 degrees of rotation of offset swage assembly 310, vacuum system 314, camera 316, and laser sensor 338 around rotation axis 324. In this manner, offset swage assembly 310 is configured to swing into a desired position offset from rotation axis 324.

Figure 5:
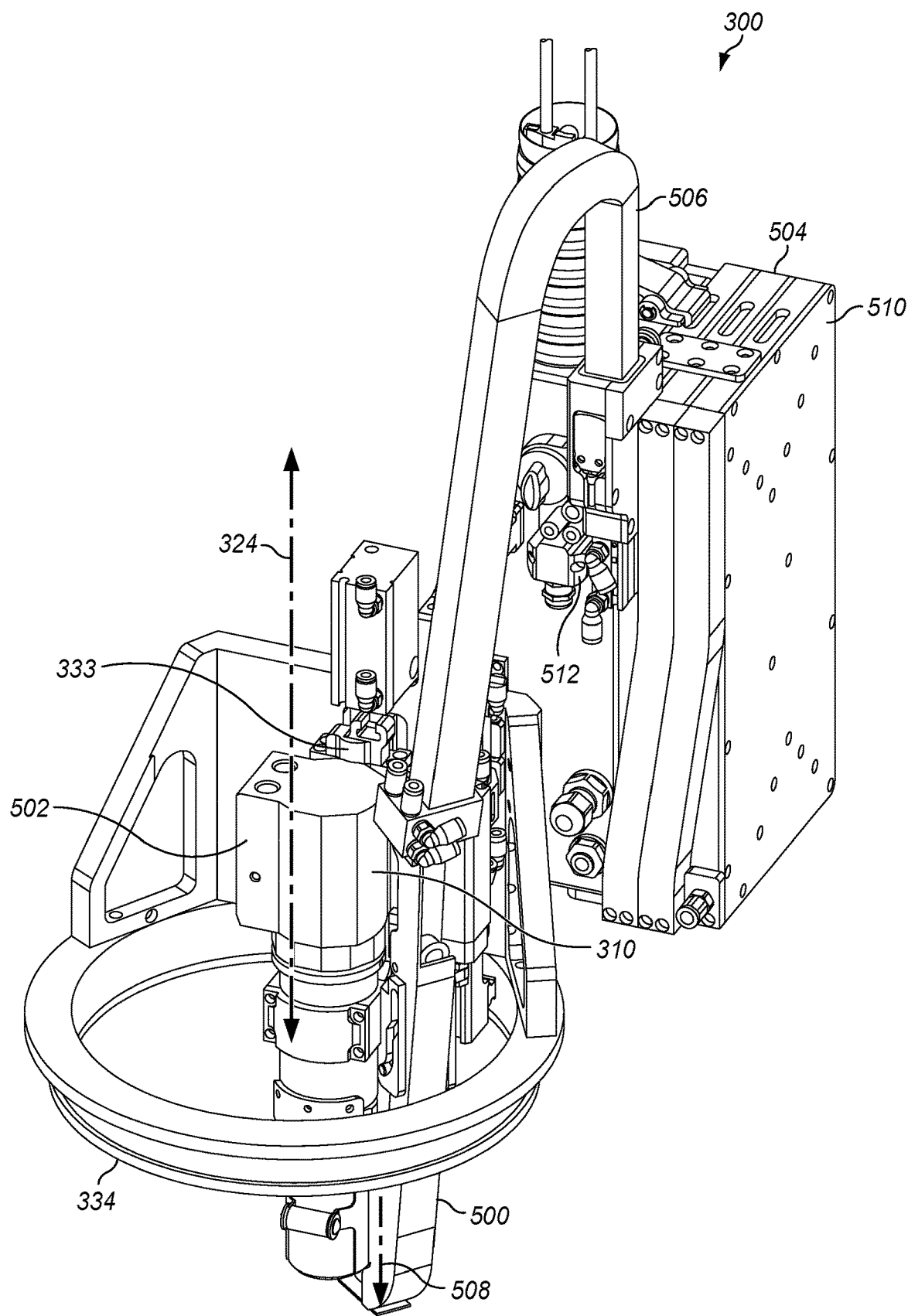
FIG. 5 is an illustration of a portion of an inner mold line machine in accordance with an illustrative embodiment.

With reference to FIG. 5, an illustration of a portion of inner mold line machine 300 is depicted in accordance with an illustrative embodiment. In this illustrative example, offset swage assembly 310 is within gear ring 334 while other components for inner mold line machine 300 are not shown. This partial illustration is employed to describe components in offset swage assembly 310 in a manner that avoids obscuring the illustration and description of these components.

In this illustrative example, offset swage assembly 310 comprises a number of different components. As depicted, offset swage assembly 310 includes collar holder 500, collar swage 502, and magazine 504. Collar holder 500 is an example of one implementation for collar holder 134 shown in block form in FIG. 1. Collar swage 502 is an example of an implementation for engager 136 shown in block form in FIG. 1.

In this illustrative example, collar holder 500 is configured to receive a collar (not shown) from magazine 504 and hold the collar for swaging by collar swage 502. As depicted, magazine 504 is connected to collar holder 500 by tube 506. Magazine 504 holds collars (not shown).

As depicted, collar holder 500 holds a collar (not shown) on axis 508 which is parallel to rotation axis 324. As shown in this illustrative example, offset swage assembly 310 is configured to rotate about rotation axis 324 when gear ring 334 is moved. As offset swage assembly 310 rotates, axis 508 rotates about rotation axis 324 and can move from side to side of rotation axis 324.

In the depicted example, magazine 504 in FIG. 5 takes the form of one or more cartridges 510. Collars (not shown) stored in cartridges 510 can be fed from cartridges 510 to collar holder 500 using collar injector 512. Collar injector 512 can be a cam or cam activated collar feed mechanism and may use compressed air to feed a collar (not shown) to collar holder 500 from magazine 504 via tube 506. In this manner, cartridges 510 function as an onboard supply of collars for offset swage assembly 310 in inner mold line machine 300. In further embodiments, other types of collar delivery systems may be utilized, such as a remote bowl feeder system.

The illustration of inner mold line machine 300 in FIGS. 3-5 is not meant to limit the manner in which an inner mold line machine or other machine employing an offset collar installer may be implemented. For example, other types of fasteners may be used in place of offset swage assembly 310 in which pins and collars are inserted by swaging. For example, another type of offset collar installer may cause engagement by rotating at least one of a collar or a bolt such that threads or grooves in these components engage each other.

In another illustrative example, other types of rotational systems may be implemented in which other degrees of movement are present other than 360 degrees. In another illustrative example, offset swage assembly 310 moves 90 degrees, 180 degrees, 270 degrees, or some other amounts of movement about rotation axis 324. In yet another illustrative example, vacuum system 314 may be omitted from inner mold line machine 300. In still another illustrative example, these components may be implemented as part of an outer mold line machine.

FIGS. 6-12 illustrate but one of countless automated fastener installation tools that may be monitored in accordance with the inventive processes described herein. Thus, FIGS. 1-5 shall be considered illustrative of just one of innumerable variations in tooling that may benefit from application of the inventive process. For example, the inventive techniques described herein may be utilized for any automated collar installation system, including those that automatically insert a pin/lockbolt, and those that rely on manual insertion of a pin/lockbolt.

Figure 6:
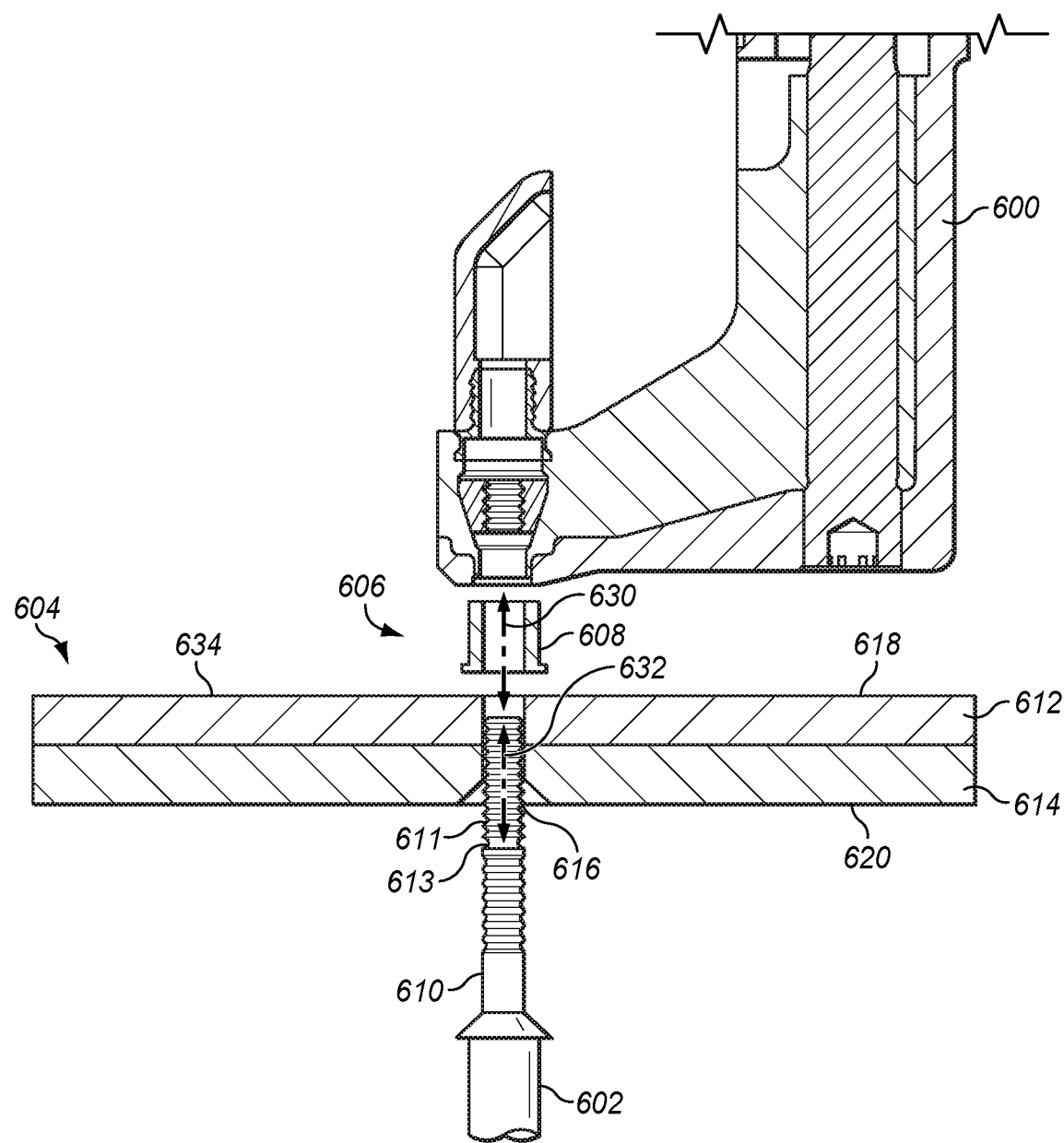
FIGS. 6-12 are illustrations of an improved process for installing a fastener in accordance with an illustrative embodiment.

With reference first to FIG. 6, an illustration of swage tool 600 positioned relative to structure 604 is depicted in accordance with an illustrative embodiment. In FIG. 6, a cross-sectional view of a portion of swage tool 600, outer mold line tool 602, and structure 604 are shown. In this illustrative example, swage tool 600 may be part of fastener installation system 208 in FIG. 2 or an implementation for offset swage assembly 310 in FIG. 3. In another illustrative example, swage tool 600 may be implemented using a currently available swage tool.

Only portions of these tools are shown to focus on illustrating operations performed to install fastener 606 comprising collar 608 and pin 610. As depicted, pin tail 611 is located at end 613 of pin 610. Other portions of these tools are not shown to avoid obscuring the illustration and description of the process.

As depicted, structure 604 is an example of an implementation of structure 204 shown in block form in FIG. 2. Structure 604 comprises component 612 and component 614. Hole 616 has been drilled through structure 604.

As depicted in this example, collar 608 has been aligned with hole 616 to obtain alignment concentricity between these two components. In other words, centerline 630 for collar 608 can be aligned with centerline 632 for hole 616 to obtain alignment concentricity between these two components. As depicted in this example, centerline 632 is substantially normal or perpendicular to surface 634 of inner mold line side 618. As a result, collar 608 is positioned such that centerline 630 is aligned or matches centerline 632.

As depicted, swage tool 600 is an example of one implementation of swage tool 224 shown in block form in FIG. 2. Outer mold line tool 602 is an example of an implementation of outer mold line machine 246 shown in block form in FIG. 2. In this illustrative example, swage tool 600 is located on inner mold line side 618 of structure 604, while outer mold line tool 602 is located on outer mold line side 620 of structure 604.

As depicted, pin 610 has been inserted into hole 616 from outer mold line side 620 of structure 604 utilizing outer mold line tool 602. In this example, only a portion of outer mold line tool 602 is utilized to insert pin 610 as depicted.

Figure 7:
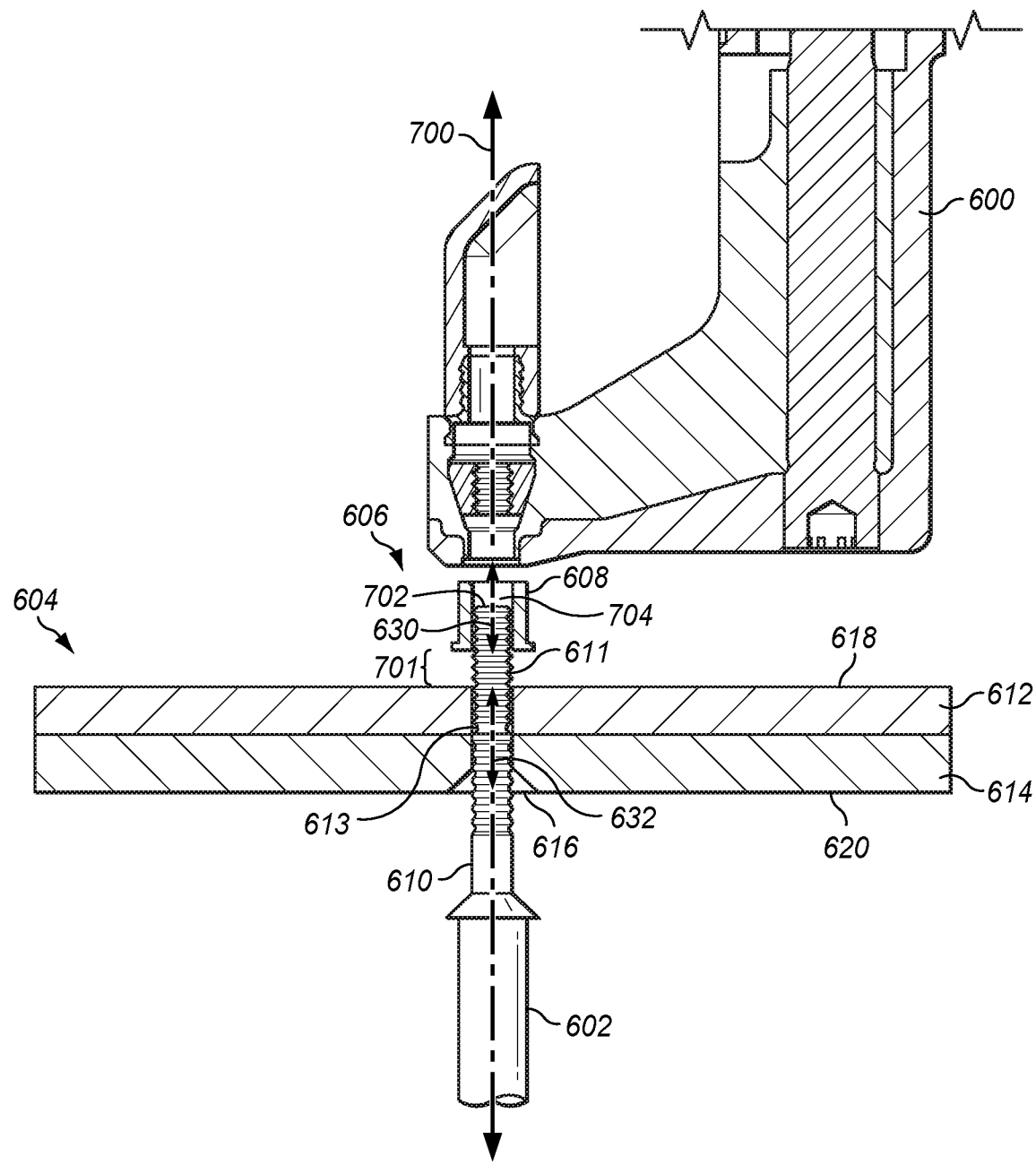

With reference to FIG. 7, an illustration of pin 610 extending into collar 608 is depicted in accordance with an illustrative embodiment. In this illustrative example, pin 610 extends through hole 616 and into collar 608.

In this example, collar 608 is positioned over hole 616 at distance 701 above hole 616. Distance 701 can be selected to allow deviation of line 700 from normal with respect to inner mold line side 618 at hole 616. In other words, distance 701 can be selected such that end 702 can extend through channel 704 in collar 608. As distance 701 decreases, the amount of deviation in line 700 from normal that can occur and allow for insertion of pin 610 though channel 704 of collar 608 reduces.

Figure 8:
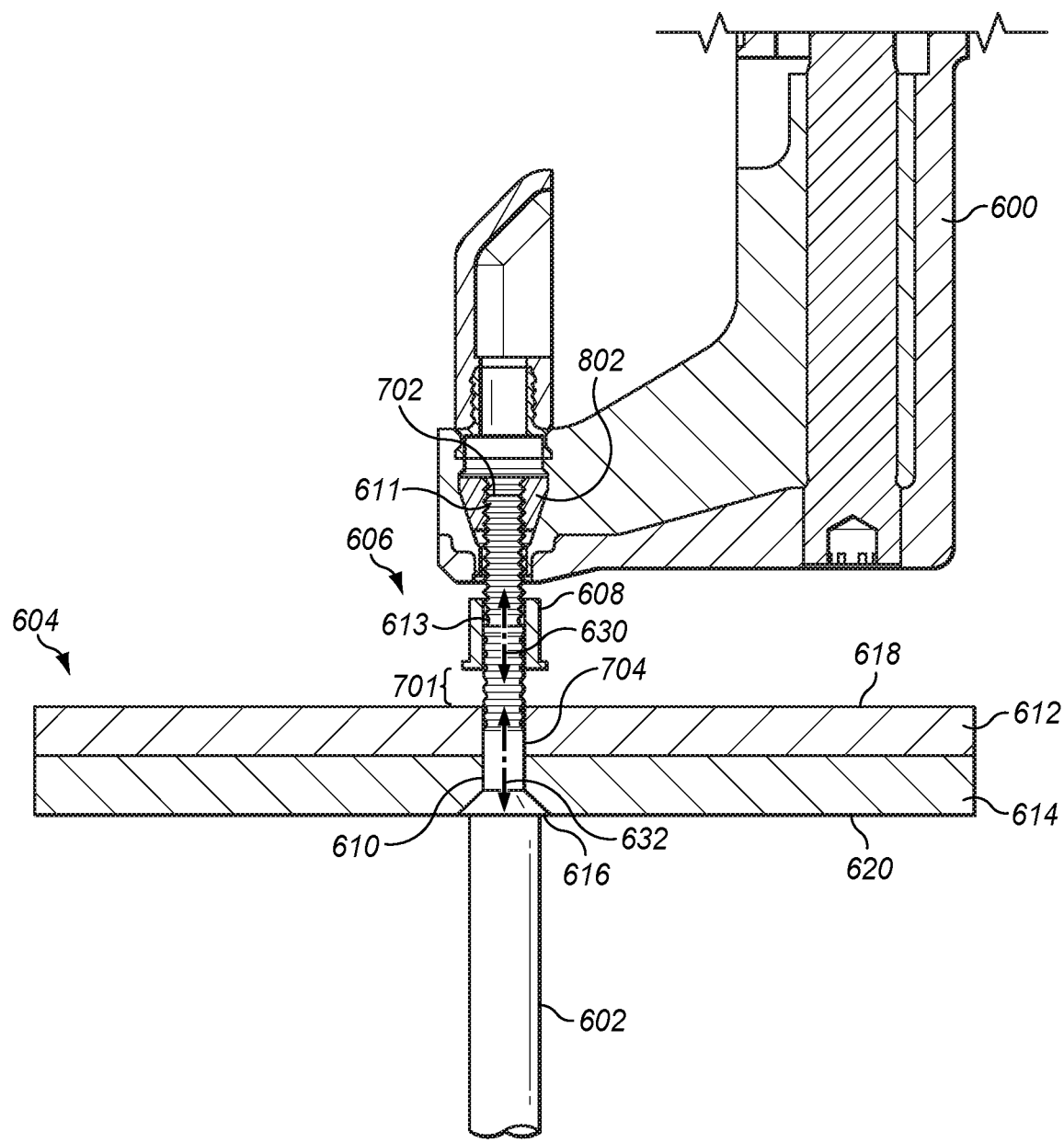

Turning now to FIG. 8, an illustration of pin 610 in a fully seated position in hole 616 is depicted in accordance with an illustrative embodiment. As depicted, pin 610 is fully seated in hole 616. Further, pin tail 611 connected to pin 610 at end 613 of pin 610 is engaged within jaws 802 of swage tool 600.

Figure 9:
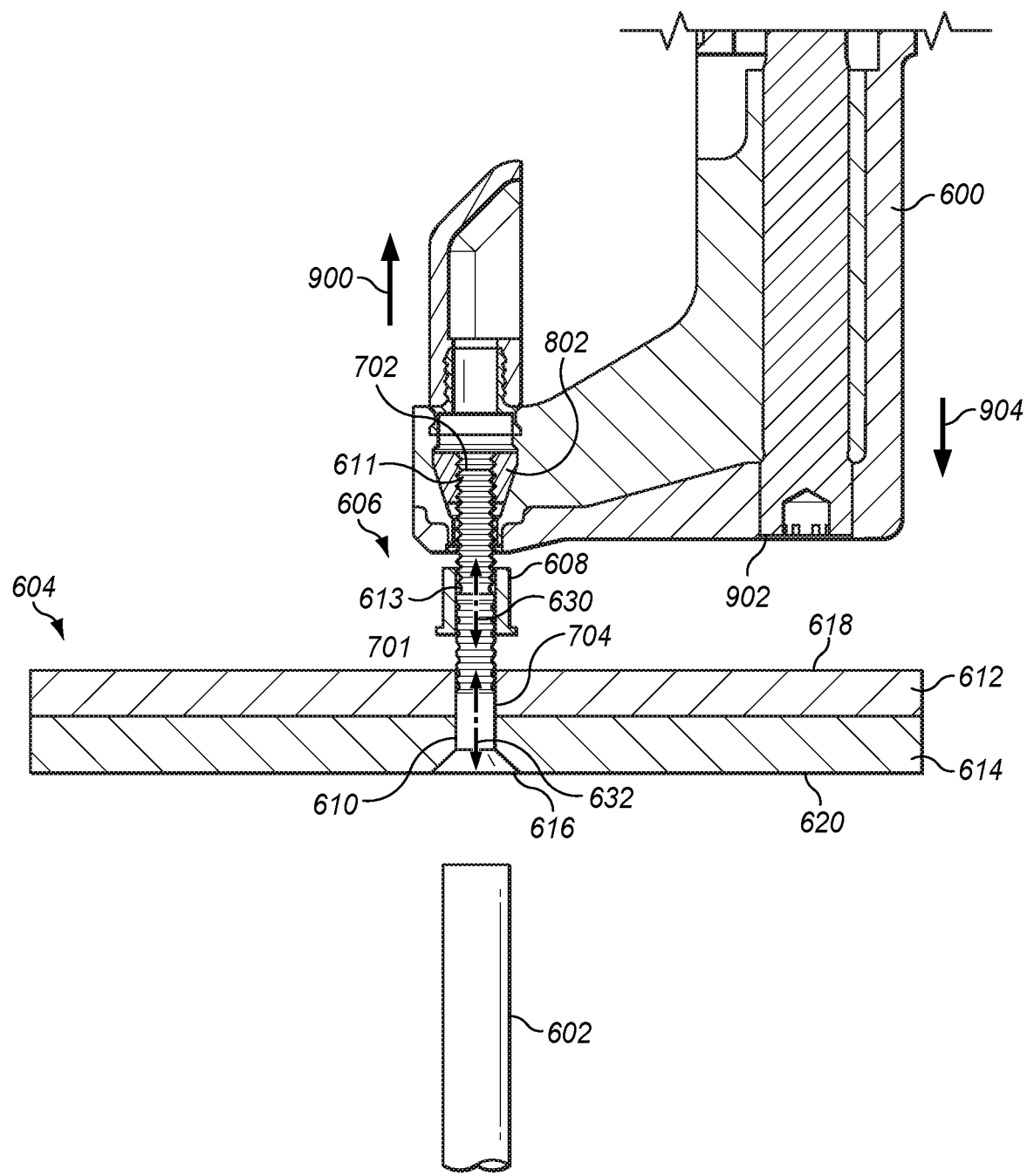

With reference to FIG. 9, an illustration of pulling the pin tail 611 is depicted in accordance with an illustrative embodiment. In this illustrative example, swage tool 600 is a hydraulic swage tool. Swage tool 600 is activated and pulls pin tail 611 in the direction of arrow 900. This operation causes anvil 902 in swage tool 600 to move in the direction of arrow 904 towards inner mold line side 618. This movement applies force on collar 608 in the direction of arrow 904.

Figure 10:
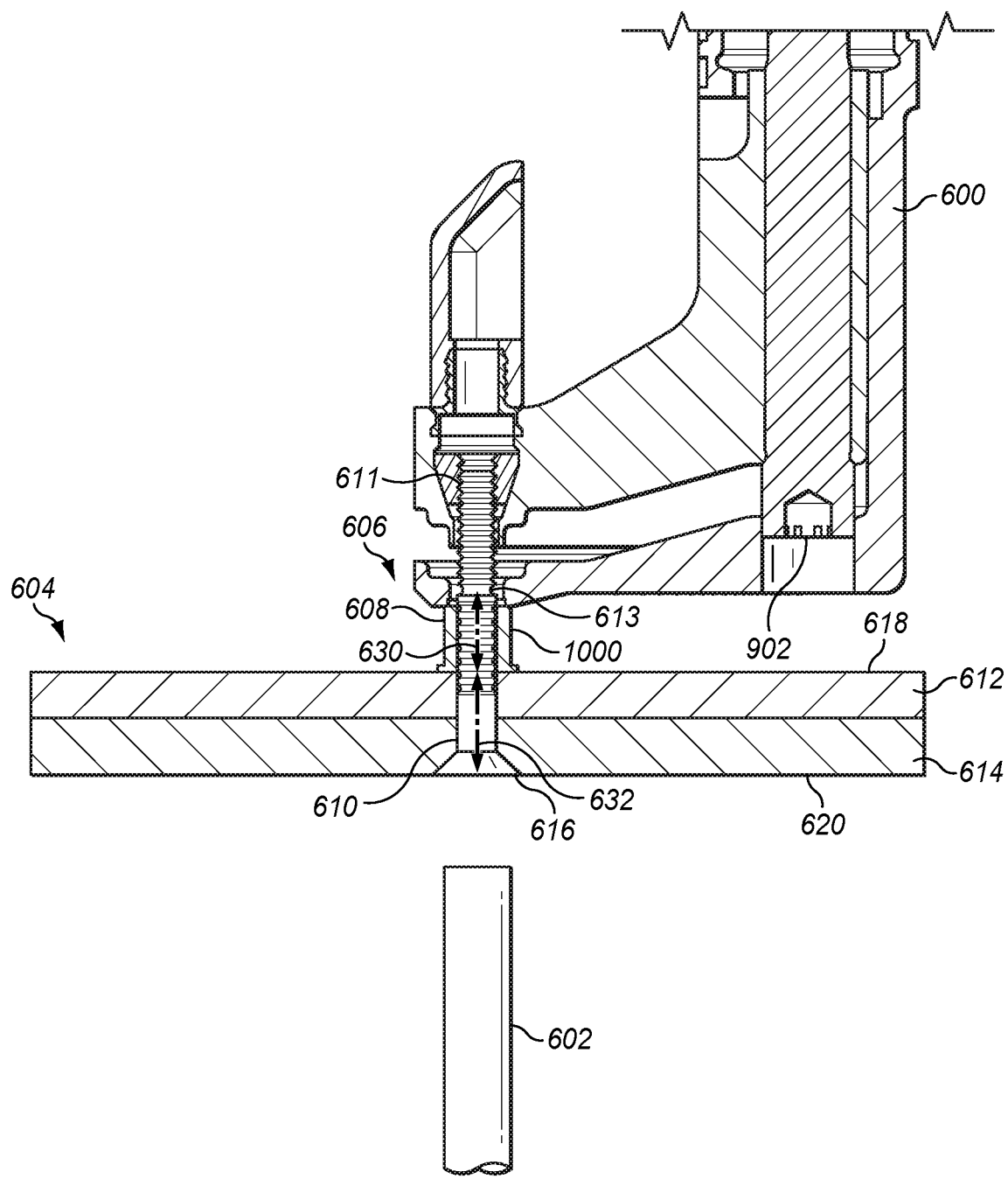

With reference to FIG. 10, an illustration of swaging the collar 608 is depicted in accordance with an illustrative embodiment. In this illustrative example, movement of collar 608 against inner mold line side 618 with anvil 902 swaging collar 608 as anvil 902 moves over collar 608. This force causes collar 608 to swage in which collar 608 deforms and engages engagement feature 1000 on pin 610.

Figure 11:
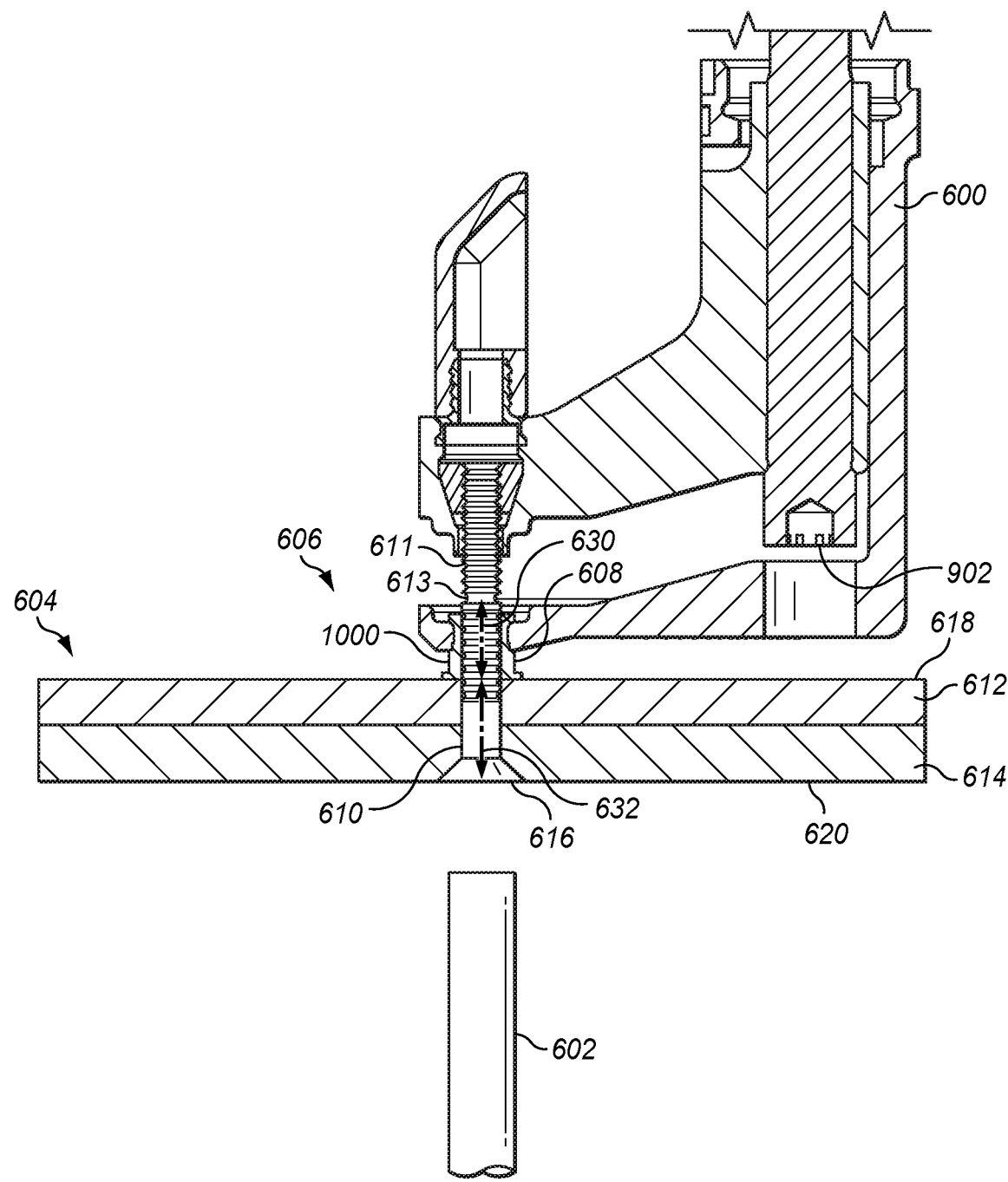

Turning to FIG. 11, an illustration of collar 608 engaged with pin 610 is depicted in accordance with an illustrative embodiment. In this illustrative example, anvil 902 has fully swaged collar 608 onto pin 610.

Figure 12:
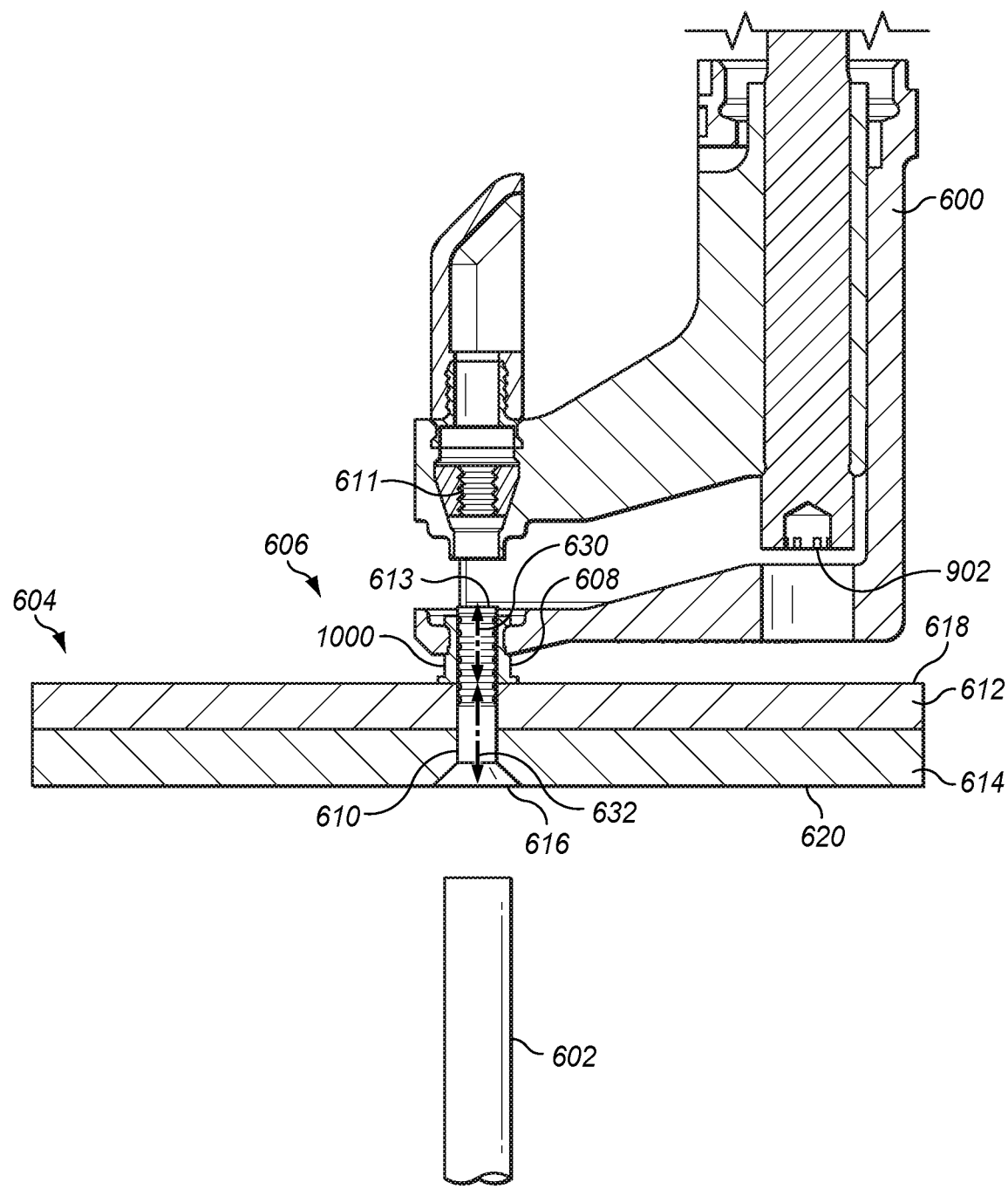

Turning now to FIG. 12, an illustration of a completed installation of fastener 606 is depicted in accordance with an illustrative embodiment. As can be seen in this example, pin tail 611 (not shown) has broken off pin 610. The engagement of collar 608 and pin 610 is completed in this figure.

The illustration of installing a fastener utilizing the swage tool 600 in FIGS. 6-12 is provided for illustrating one manner in which a fastener may be installed. The operations and components illustrated are not meant to limit the manner in which fastener 606 may be installed utilizing the swage tool 600. For example, distance 701 between collar 608 and inner mold line side 618 may be substantially zero in some examples. In another illustrative example, swage tool 600 may not be an offset swage tool as depicted in these examples.

Figure 13:
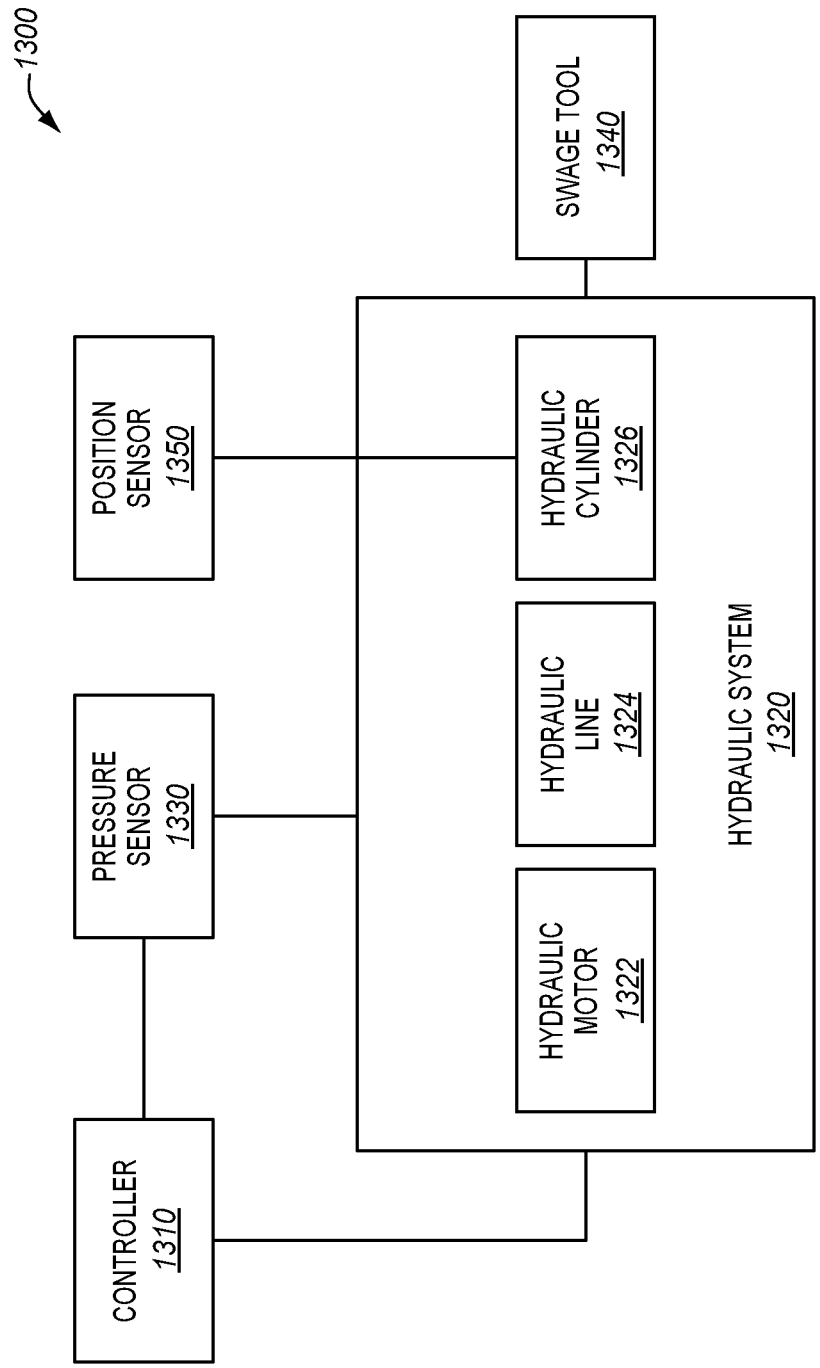
FIG. 13 is a block diagram of pressure-based control system for a swage tool in an illustrative embodiment.

FIG. 13 is a block diagram of pressure-based control system 1300 for a swage tool (e.g., offset swage assembly 310) in an illustrative embodiment. Pressure-based control system 1300 comprises any system, component, or device operable to review pressure measurements in a hydraulic system that drives a swage tool, and dynamically control swaging operations based on the pressure measurements. Being able to preemptively terminate a swaging operation based on pressure (e.g., instead of using a timer) allows swaging operations to be completed more quickly, which increases the overall speed of fabrication when installing fasteners.

In this embodiment, pressure-based control system 1300 includes controller 1310, which monitors the hydraulic system 1320 based on input from pressure sensor 1330, and provides instructions to hydraulic system 1320 in order to direct the operations of swage tool 1340. Controller 1310 may be implemented, for example, as custom circuitry, as a hardware processor executing programmed instructions, or some combination thereof.

Pressure sensor 1330 may comprise any suitable sensing device capable of measuring pressure, such as a piezoresistive strain gauge sensor, a capacitive sensor, an electromagnetic sensor, a piezoelectric sensor, an optical sensor, etc. Pressure sensor 1330 may be physically coupled with any portion of hydraulic system that is driven by hydraulic motor 1322. For example, pressure sensor 1330 may be coupled with hydraulic line 1324, hydraulic cylinder 1326, etc. Pressure sensor 1330 is electronically coupled with controller 1310, and may provide input in the form of signals indicating pressure values to controller 1310. A position sensor 1350 (e.g., laser, linear actuator, etc.) may also be used in order to detect a position of hydraulic cylinder 1326 as hydraulic cylinder 1326 is driven by hydraulic motor 1322.

Hydraulic system 1320 provides hydraulic pressure that drives the operations of a swage tool 1340 as the swage tool 1340 proceeds to install fasteners. Hydraulic motor 1322 builds hydraulic pressure which is applied via hydraulic line 1324 to hydraulic cylinder 1326. In some embodiments, hydraulic motor 1322 may build thousands of pounds per square inch (PSI) of pressure within hydraulic system 1320. This pressure displaces hydraulic cylinder 1326. Specifically, as more pressure is applied, hydraulic cylinder 1326 is driven a further distance. Hydraulic cylinder 1326 may drive jaws 802 and/or anvil 902 during swaging operations. Hydraulic motor 1322 may comprise a motor or a pump capable of increasing hydraulic pressure. Hydraulic cylinder 1326 may comprise any suitable component capable of moving in response to changes in hydraulic pressure within hydraulic system 1320 in order to drive one or more components of swage tool 1340.

Illustrative details of the operation of hydraulic system 1320 will be discussed with regard to FIG. 14. Assume, for this embodiment, that swage tool 1340 has been placed over a pintail of a lockbolt, and is about to swage a collar onto the lockbolt in order to install a fastener. Controller 1310 directs hydraulic motor 1322 to operate, which increases pressure in hydraulic system 1320 over time. Controller 1310 also receives input from pressure sensor 1330 indicating pressure levels detected within hydraulic system 1320. Hydraulic system 1320 drives swage tool 1340 (e.g., by driving jaws and/or an anvil of the swage tool 1340)

Figure 14:
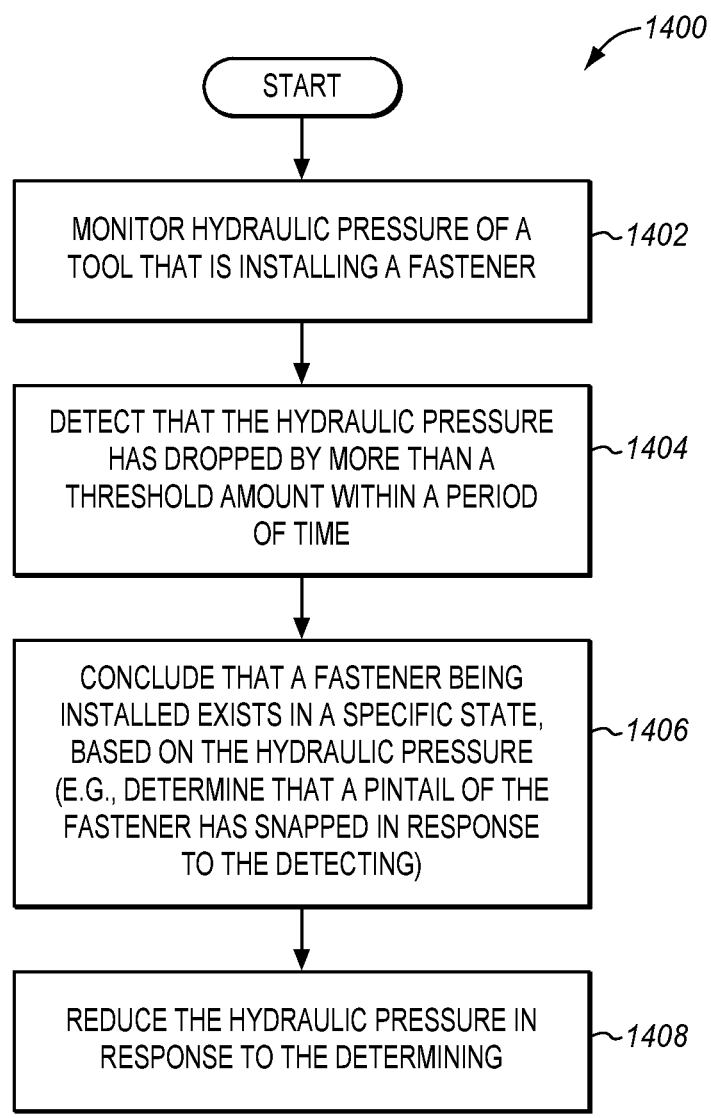
FIG. 14 is a flowchart illustrating a method for operating a pressure-based control system for a swage tool in an illustrative embodiment.

FIG. 14 is a flowchart illustrating a method 1400 for operating a pressure-based control system in an illustrative embodiment. The steps of method 1400 are described with reference to pressure-based control system 1300 of FIG. 13, but those skilled in the art will appreciate that method 1400 may be performed in other systems. The steps of the flowcharts described herein are not all inclusive and may include other steps not shown. The steps described herein may also be performed in an alternative order.

In step 1402, controller 1310 monitors hydraulic pressure of a tool (e.g., swage tool 1340) that is installing a fastener such as a lockbolt. For example, controller 1310 may periodically acquire pressure measurements from pressure sensor 1330, such as once every five milliseconds or every twenty milliseconds. Controller 1310 stores these pressure measurements in an internal memory. Controller 1310 (or pressure sensor 1330) may then detect pressure changes by calculating changes between consecutively acquired pressure measurements over time. As hydraulic motor 1322 runs, pressure is increased within hydraulic system 1320, which extends hydraulic cylinder 1326 further outward. Controller 1310 may also acquire measurements from position sensor 1350 as desired, for example at a sampling rate of once every five or ten milliseconds, or continuously across a time frame of ten to fifty milliseconds.

In step 1404, controller 1310 detects that pressure has dropped by more than a threshold amount within a period of time that occurs during the swaging operation. For example, controller 1310 may detect that pressure has dropped at a rate of more than one hundred PSI per second within a period of fifty milliseconds. As a part of the detecting, controller 1310 may acquire and review multiple pressure changes over time. The additional changes may be acquired for example at a sampling rate of once every five or ten milliseconds, or continuously across a time frame of ten to fifty milliseconds.

In response to detecting in step 1404, controller 1310 concludes that a fastener exists in a specific state (e.g., arrives at a conclusion indicating a state of a fastener being installed), based on the hydraulic pressure (step 1406). The conclusion may indicate whether the fastener has been installed within a predefined tolerance, and the conclusion may be based on changes in the hydraulic pressure that indicate progress of a swaging operation. In one embodiment, the controller 1310 determines that a pintail of the fastener has snapped, and that the swaging operation has therefore completed. The dip in pressure is indicative of swage tool 1340 mechanically rebounding in response to the pintail snapping. Thus, even though the hydraulic motor 1322 continues to build pressure within the hydraulic system 1320, during the brief period of mechanical rebound pressure is actually reduced within the hydraulic system 1320. In order to ensure that a rebound has occurred (e.g., instead of a hydraulic leak), controller 1310 may for example wait for pressure to return to a pressure that was measured before the dip occurred.

In response to determining that the pintail has snapped, controller 1310 may reduce the hydraulic pressure in hydraulic system 1320 (step 1408). This may comprise terminating operations at hydraulic motor 1322 by instructing hydraulic motor 1322 to halt, opening a release valve within hydraulic system 1320, etc. In further embodiments, controller 1310 may further instruct hydraulic motor 1322 to run in reverse in order to retract hydraulic cylinder 1326 to a default position.

Figure 15:
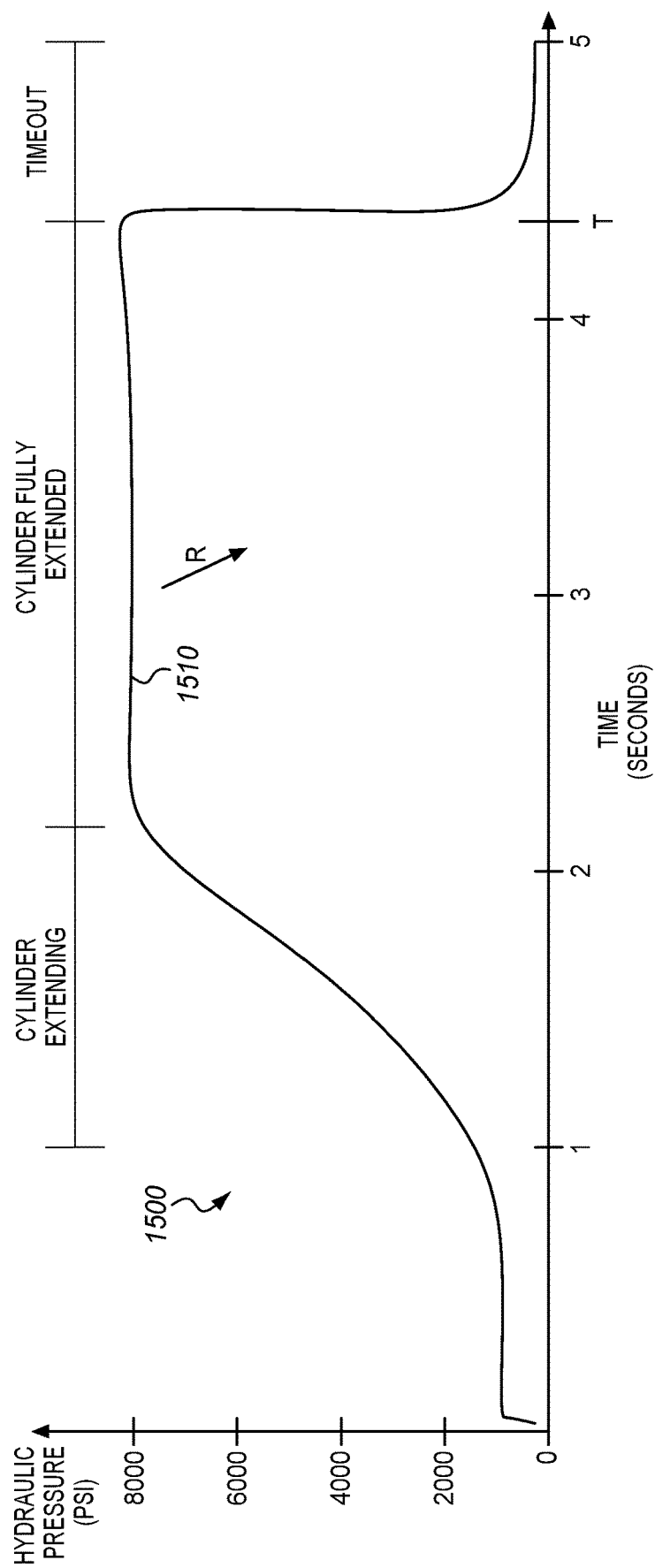
FIG. 15 is a chart illustrating an unsuccessful swaging operation in an illustrative embodiment.

FIG. 15 is a chart illustrating an unsuccessful swaging operation in an illustrative embodiment. As shown in FIG. 15, when swaging is unsuccessful (e.g., because jaws of a swage tool have missed a pintail, because a collar is missing, etc.) no rebound effect occurs. Instead, readings 1510 show that pressure slowly ramps up in a cylinder extending phase, and then remains high while the cylinder is fully extended. After a timeout period at time T indicating a duration of the swaging operation, if pressure has not decreased at controller 1310 by more than the threshold rate R, controller 1310 instructs hydraulic motor 1322 to halt and reports a swaging error indicating that a technician should review the fastener that swage tool 1340 just attempted to install.

Figure 16:
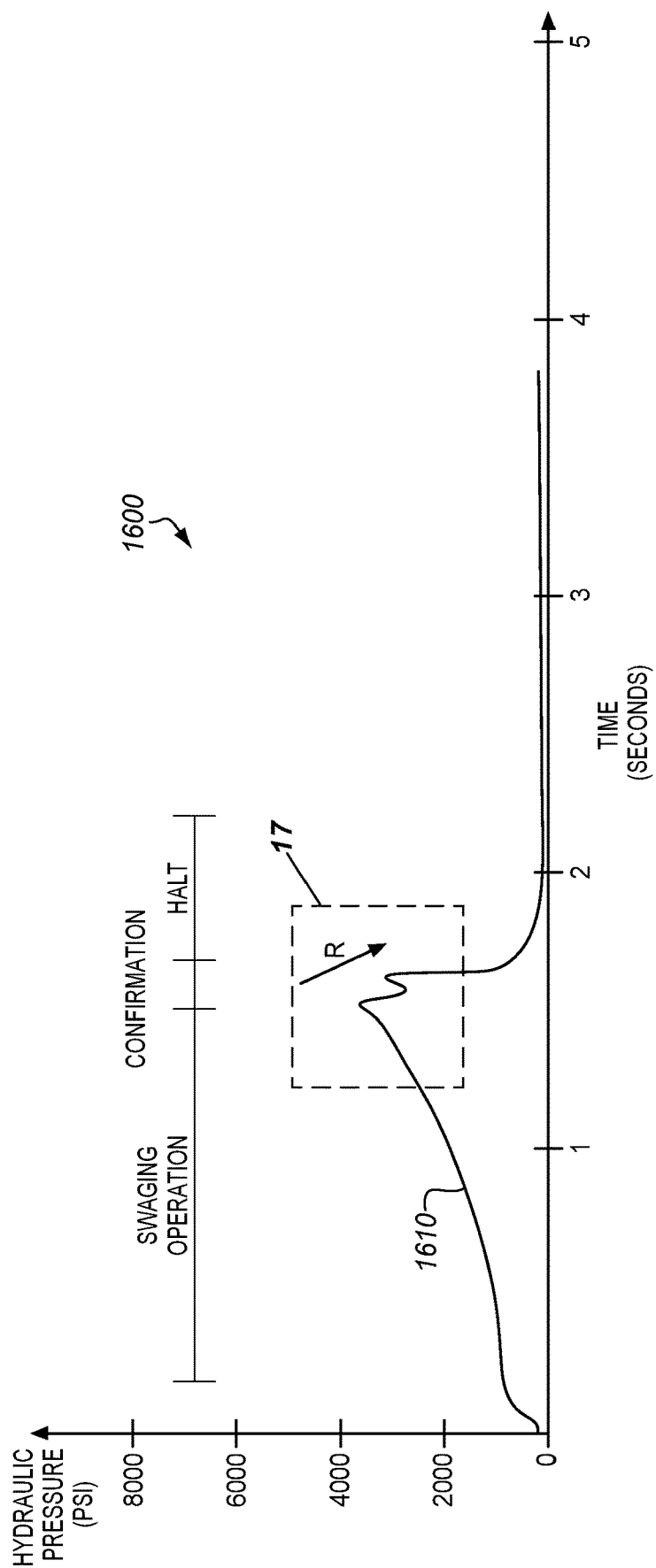
FIG. 16 is a chart illustrating a successful swaging operation in an illustrative embodiment.

FIG. 16 is a chart illustrating a successful swaging operation in an illustrative embodiment. Readings 1610 of FIG. 16 illustrate an increase in pressure over time as a swaging operation is performed and hydraulic cylinder 1326 is extended. Upon a pintail snapping, however, pressure drops due to the rebound effect discussed above. During this period of pressure drop, controller 1310 performs a confirmation that the pressure drop has continued for at least a threshold amount of time (e.g., ten to fifty milliseconds) and that swaging has completed. Controller 1310 may therefore instruct hydraulic motor 1322 to halt early (e.g., before a timeout at time T). This provides swage tool 1340 with increased efficiency, because swage tool 1340 may proceed more rapidly to installing the next fastener.

Figure 17:
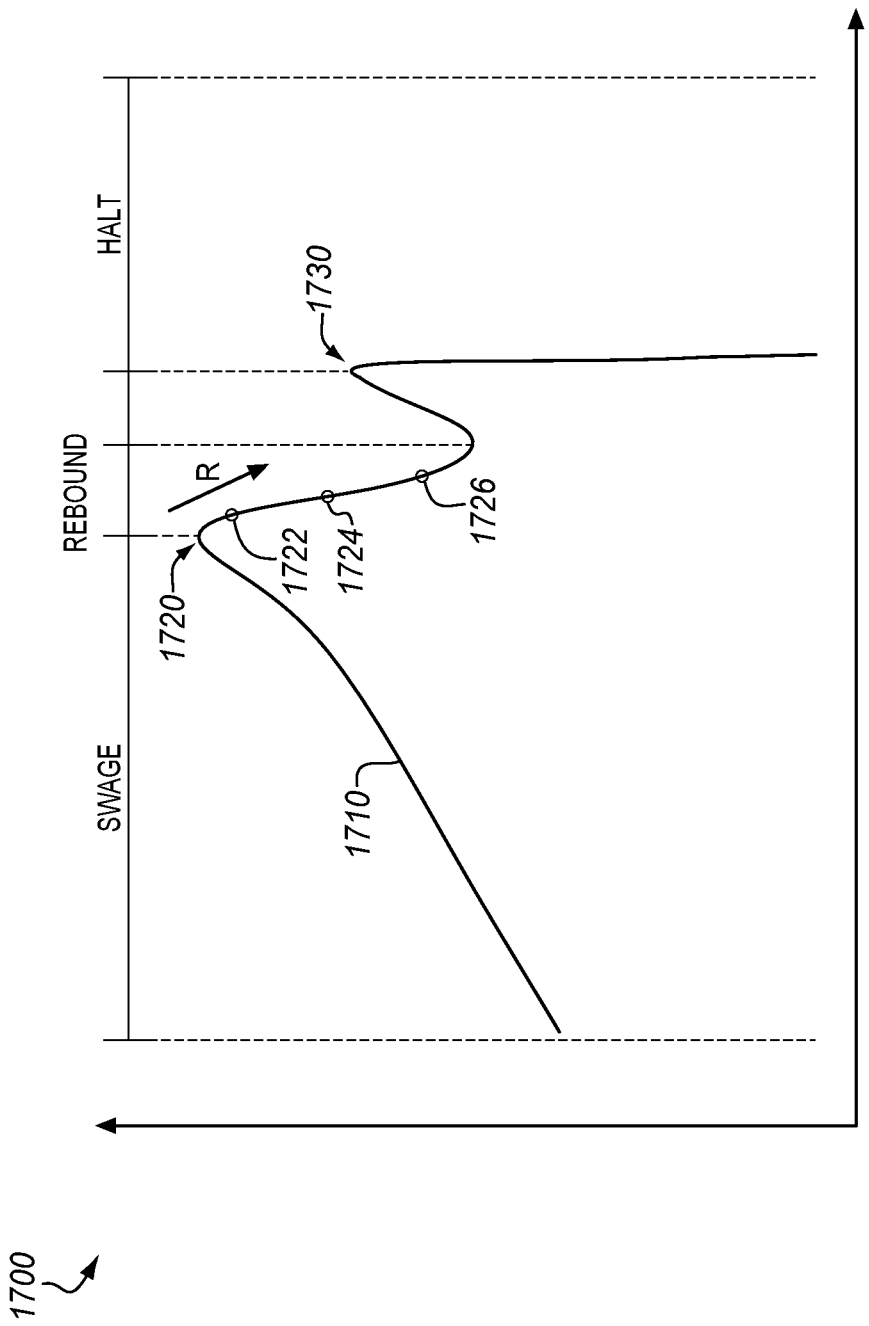
FIG. 17 is a zoomed in view of a portion of the chart of FIG. 16.

FIG. 17 is a zoomed in view of a portion of the chart of FIG. 16, and corresponds with region 17 of FIG. 16. In FIG. 17, a swage period, snap period, rebound period, and halt period are illustrated. In the swage period, readings 1710 indicate that pressure slowly increases within hydraulic system 1320 as hydraulic cylinder 1326 is extended and as swaging is expected to be taking place. At time 1720, a peak pressure is reached, after which reading 1722, reading 1724, and reading 1726 all indicate drops in pressure from immediately prior readings. After this trend continues for a predetermined time period, controller 1310 determines that swaging has been completed (e.g., because the drop in pressure is indicative of a rebound effect caused by the snapping of a pintail). After the rebound, pressure continues to increase as hydraulic motor 1322 continues to operate. Thus, controller 1310 instructs hydraulic motor 1322 to halt at time 1730, and pressure proceeds to drop.

In further embodiments, controller 1310 may control hydraulic motor 1322 during a return phase (e.g., while hydraulic cylinder 1326 is being retracted) in addition to during swaging, and may monitor pressure during these periods. During the return cycle, a similar "rebound" effect may occur when a collar is ejected from a swage nose of swage tool 1340. The detection of this rebound during the return cycle, wherein pressure drops by more than a threshold amount for more than a predetermined period of time, may help to confirm the conclusion that swaging has completed successfully.

In still further embodiments a position sensor may measure the location of hydraulic cylinder 1326 during swaging and/or a return phase. The position of hydraulic cylinder 1326 may be considered in combination with data from pressure sensor 1330 in order for controller 1310 to confirm whether a swaging operation has completed successfully, and what type of failure has occurred if the swaging operation did not complete successfully. For example, controller 1310 may distinguish between a swage performed on a lockbolt that is missing a collar, a swage performed on a lockbolt having a pintail that lacks grooves, and a partial swage (e.g., side loading at a pintail) based on pressure and position measurements over time.

Figure 18:
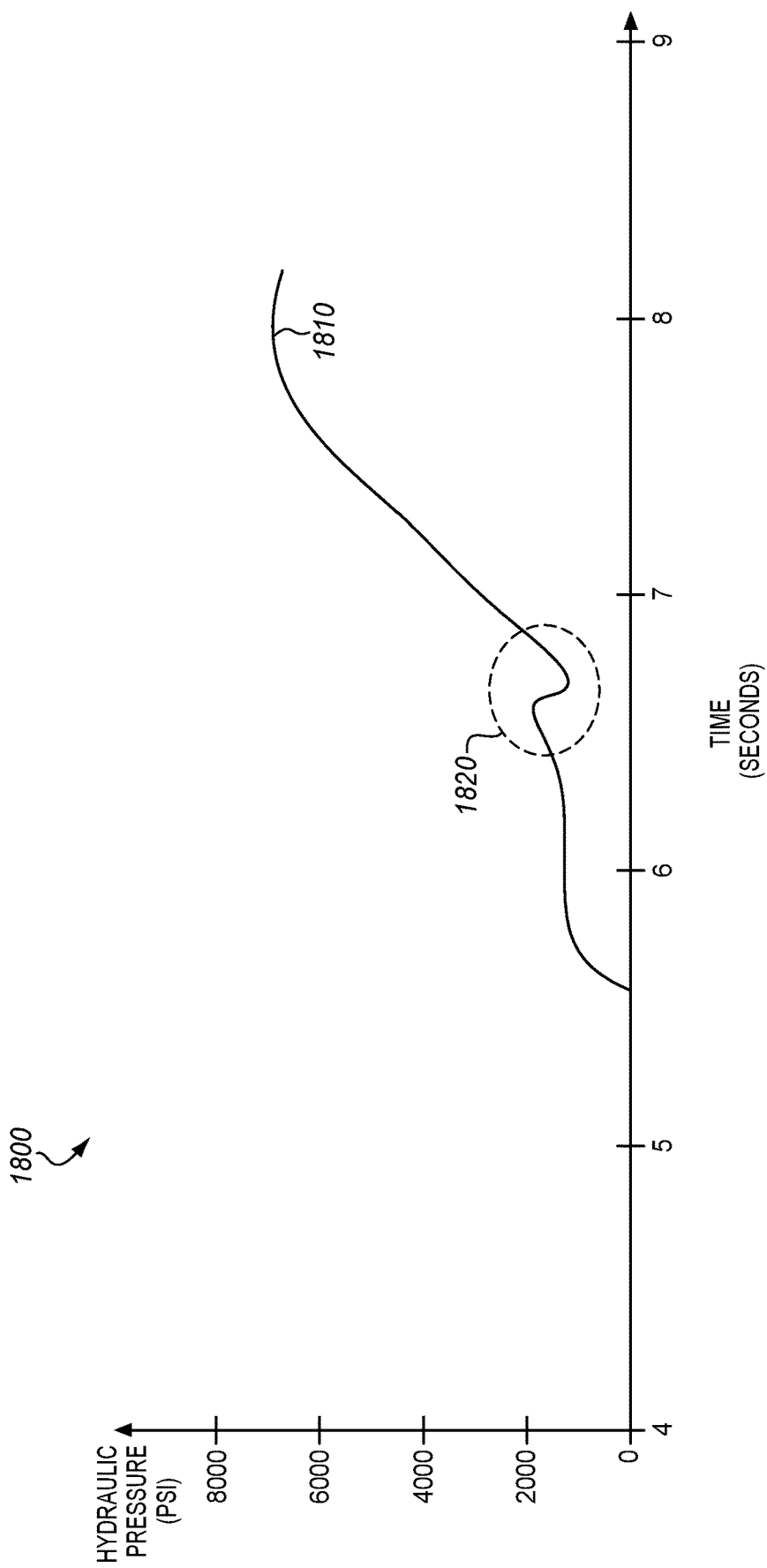
FIG. 18 is a chart illustrating ejection of a swage nose from a swaged collar in an illustrative embodiment.

FIG. 18 is a chart 1800 illustrating ejection of a swage nose from a swaged collar in an illustrative embodiment. Swaging has completed, and hydraulic cylinder 1326 is now being retracted via hydraulic motor 1322. In FIG. 18, a pressure sensor 1330 measures the pressure 1810 within a return path ("return path pressure") of hydraulic system 1320 as hydraulic cylinder 1326 is retracted. When hydraulic cylinder 1326 is being retracted, a die of swage tool 1340 pulls/ejects off of the swaged lockbolt collar, resulting in a reduction of pressure over a short interval (e.g., a reduction of more than ten PSI per second, over a period of ten to fifty milliseconds). This dip 1820 in pressure 1810 may be detected by controller 1310, and used to confirm that swage tool 1340 has properly popped off of the collar. If no dip is detected when hydraulic cylinder 1326 is returned, controller 1310 may report that no collar was in place when the swaging operation was performed, or that a shallow swage was performed. A technician may then inspect the fastener.

Figure 19:
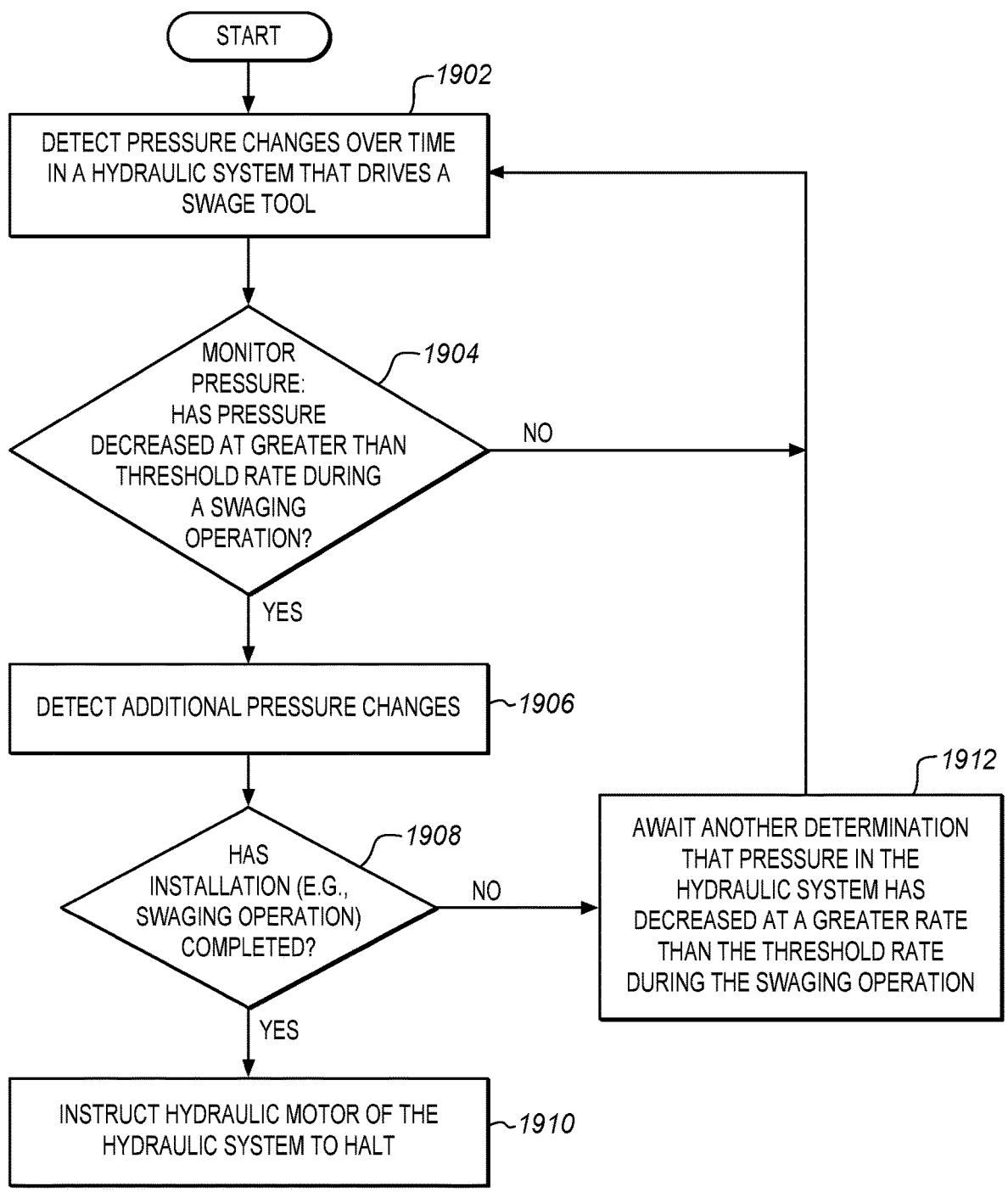
FIG. 19 is a flowchart illustrating a further method for operating a pressure-based control system for a swage tool in an illustrative embodiment.

FIG. 19 is a flowchart illustrating a method 1900 for operating a pressure-based control system in an illustrative embodiment. The steps of method 1900 are described with reference to pressure-based control system 1300 of FIG. 13, but those skilled in the art will appreciate that method 1900 may be performed in other systems. The steps of the flowcharts described herein are not all inclusive and may include other steps not shown. The steps described herein may also be performed in an alternative order.

In step 1902, controller 1310 detects pressure changes over time in hydraulic system 1320. As discussed above, hydraulic system 1320 drives swage tool 1340 (e.g., by driving jaws and/or an anvil of the swage tool 1340). Controller 1310 may for example periodically acquire measurements from pressure sensor 1330, such as once every five milliseconds or every twenty milliseconds. Controller 1310 stores these pressure measurements in an internal memory. Controller 1310 may then detect pressure changes by calculating changes between consecutively acquired pressure measurements over time. As hydraulic motor 1322 runs, pressure is increased within hydraulic system 1320, which extends hydraulic cylinder 1326 further outward.

Controller 1310 may also acquire measurements from position sensor 1350 as desired, for example at a sampling rate of once every five or ten milliseconds, or continuously across a time frame of ten to fifty milliseconds.

In step 1904, controller 1310 determines whether pressure has decreased at greater than a threshold rate during the swaging operation (e.g., by more than one PSI per second, by more than one hundred PSI per second, etc.). If pressure has decreased by more than the threshold rate, then this indicates that a swaging operation may have completed, and that swage tool 1340 may be mechanically rebounding in response to snapping a pintail. However, at this point in time completion of the swaging operation is not confirmed. Thus, controller 1310 proceeds to step 1406 to detect additional pressure changes confirming that the pintail has snapped. The additional changes may be acquired for example at a sampling rate of once every five or ten milliseconds, or continuously across a time frame of ten to fifty milliseconds. Alternatively, if pressure has not decreased by more than the threshold rate, then controller 1310 returns to monitoring pressure in step 1402.

In step 1906, controller 1310 detects additional pressure changes in hydraulic system 1320. For example, controller 1310 may continue to measure pressure over time within hydraulic system 1320 as time progresses. Based on these additional pressure changes, controller 1310 determines/confirms whether the swaging operation has completed in step 1908. For example, controller 1310 may review pressure readings taken over a predefined period of time (e.g., between ten and fifty milliseconds, such as between twenty to thirty milliseconds). A threshold number of pressure readings (e.g., three pressure readings) in the time period may indicate that pressure has continued to drop at a greater rate than the threshold rate. If so, controller 1310 may confirm that a swaging operation has completed. Over a brief time period of milliseconds, such a drop in pressure may be indicative of swaging tool 1340 rebounding (creating a minor shockwave in pressure within hydraulic system 1320) (in response to the pintail snapping. Hence, the drop in pressure over time is indicative of a pintail snapping. Alternatively, controller 1310 may confirm that a swaging operation has completed by determining that the pressure has dropped by more than a threshold amount over the predefined period of time. Such a detection technique takes advantage of the fact that when a pintail is broken at the end of a swaging operation, swage tool 1340 may rebound over a short time period, resulting in a transitory pressure drop within hydraulic system 1320 even though hydraulic motor 1322 continues to operate. Thus, controller 1310 may utilize pressure readings to infer/determine that a pintail of a lockbolt has snapped and that a swaging operation has completed. Controller 1310 may further wait for pressure to return to the initial pressure that existed before the dip/rebound occurred.

If the additional pressure changes indicate that swaging has completed in step 1408, then controller 1310 proceeds to step 1910. In step 1910, controller 1310 instructs hydraulic motor 1322 to halt operations, resulting in a loss of hydraulic pressure within hydraulic system 1320. This concludes active operation of swage tool 1340 in installing a fastener, and save time that would otherwise be wasted waiting for a predefined period of time. Hence, swage tool 1340 may be moved more quickly to a next location in order to install another fastener.

In the event that the swaging operation has not completed (e.g., because pressure has begun to increase instead of decrease, because pressure and/or position readings are not indicative of a pintail snapping, etc.), controller 1310 proceeds to step 1912, wherein it awaits another determination that pressure in the hydraulic system has decreased at a greater rate than the threshold rate during the swaging operation.

EXAMPLES

Figure 20:
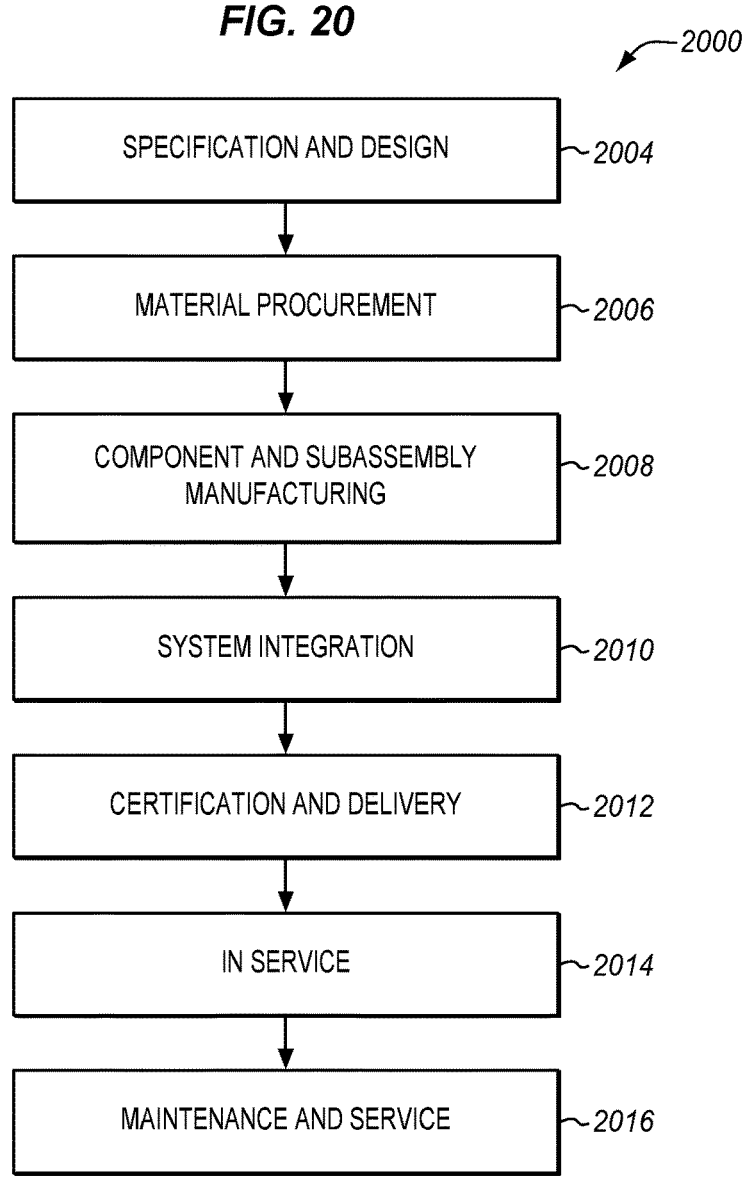
FIG. 20 is a flow diagram of aircraft production and service methodology in an illustrative embodiment.
Figure 21:
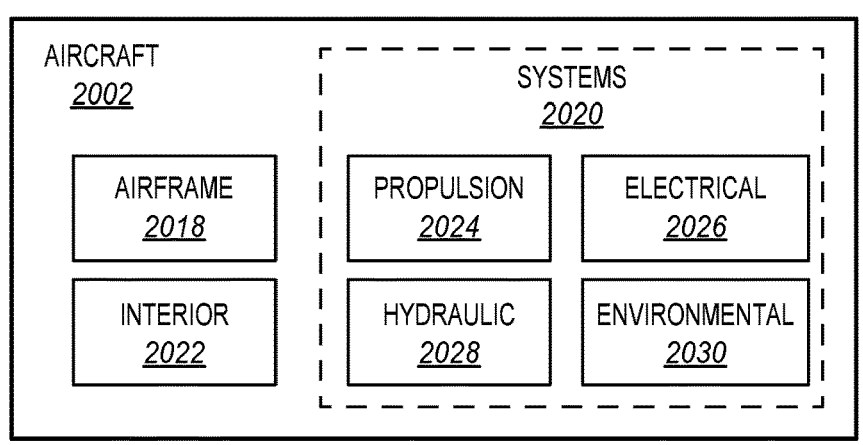
FIG. 21 is a block diagram of an aircraft in an illustrative embodiment.

Referring more particularly to the drawings, embodiments of the disclosure may be described in the context of aircraft manufacturing and service in method 2000 as shown in FIG. 20 and an aircraft 2002 as shown in FIG. 21. During pre-production, method 2000 may include specification and design 2004 of the aircraft 2002 and material procurement 2006. During production, component and subassembly manufacturing 2008 and system integration 2010 of the aircraft 2002 takes place. Thereafter, the aircraft 2002 may go through certification and delivery 2012 in order to be placed in service 2014. While in service by a customer, the aircraft 2002 is scheduled for routine work in maintenance and service 2016 (which may also include modification, reconfiguration, refurbishment, and so on). Apparatus and methods embodied herein may be employed during any one or more suitable stages of the production and service described in method 2000 (e.g., specification and design 2004, material procurement 2006, component and subassembly manufacturing 2008, system integration 2010, certification and delivery 2012, service 2014, maintenance and service 2016) and/or any suitable component of aircraft 2002 (e.g., airframe 2018, systems 2020, interior 2022, propulsion system 2024, electrical system 2026, hydraulic system 2028, environmental 2030).

Each of the processes of method 2000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 21, the aircraft 2002 produced by method 2000 may include an airframe 2018 with a plurality of systems 2020 and an interior 2022. Examples of systems 2020 include one or more of a propulsion system 2024, an electrical system 2026, a hydraulic system 2028, and an environmental system 2030. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 2000. For example, components or subassemblies corresponding to component and subassembly manufacturing 2008 may be fabricated or manufactured in a manner similar to components or subassemblies produced while the aircraft 2002 is in service. Also, one or more apparatus embodiments, method embodiments, or a combination thereof may be utilized during the subassembly manufacturing 2008 and system integration 2010, for example, by substantially expediting assembly of or reducing the cost of an aircraft 2002. Similarly, one or more of apparatus embodiments, method embodiments, or a combination thereof may be utilized while the aircraft 2002 is in service, for example and without limitation during the maintenance and service 2016. For example, the techniques and systems described herein may be used for material procurement 2006, component and subassembly manufacturing 2008, system integration 2010, service 2014, and/or maintenance and service 2016, and/or may be used for airframe 2018 and/or interior 2022. These techniques and systems may even be utilized for systems 2020, including, for example, propulsion system 2024, electrical system 2026, hydraulic 2028, and/or environmental system 2030.

In one embodiment, a part comprises a portion of airframe 2018, and is manufactured during component and subassembly manufacturing 2008. The part may then be assembled into an aircraft in system integration 2010, and then be utilized in service 2014 until wear renders the part unusable. Then, in maintenance and service 2016, the part may be discarded and replaced with a newly manufactured part. Inventive components and methods may be utilized throughout component and subassembly manufacturing 2008 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for inspecting installation of a fastener, the method comprising:
monitoring hydraulic pressure of a tool that is installing the fastener;
concluding that the fastener being installed exists in a specific state, based on an amount of decrease in the hydraulic pressure during a predefined length of time;
detecting that the hydraulic pressure has dropped by more than a threshold amount within a period of time;
determining that a pintail of the fastener has snapped in response to the detecting;
automatically reducing the hydraulic pressure in response to the determining; and
confirming the state based on additional monitoring of hydraulic pressure.

2. The method of claim 1 wherein:
the concluding indicates whether the fastener has been installed within a predefined tolerance, and the conclusion is based on changes in the hydraulic pressure that indicate progress of a swaging operation.

3. The method of claim 1 wherein:
reducing the hydraulic pressure is performed by operating a release valve.

4. The method of claim 1 further comprising:
reporting a swaging error in response to determining that the hydraulic pressure has not dropped by more than a threshold amount during installation of the fastener.

5. The method of claim 1 further comprising:
confirming that the tool has pulled off from a lockbolt collar of the fastener, based on a return path pressure of the tool.

6. The method of claim 1 wherein:
reducing the hydraulic pressure comprises halting a hydraulic motor that drives a hydraulic cylinder of the tool.

7. The method of claim 1 further comprising:
reporting a swaging error in response to determining that the hydraulic pressure has not dropped by more than a threshold amount after a timeout period.

8. The method of claim 1 further comprising:
measuring a position of a hydraulic cylinder of the tool while the tool is installing the fastener.

9. The method of claim 1 wherein:
concluding that the fastener exists in a specific state is based on input from an ultrasonic sensor.

10. The method of claim 1 wherein:
concluding that the fastener exists in a specific state is based on input from a light detection and ranging scanner.

11. The method of claim 1 wherein:
concluding that the fastener exists in a specific state is based on input from a camera system.

12. The method of claim 1 wherein:
detecting that the hydraulic pressure has dropped by more than a threshold amount within a period of time comprises: determining that pressure has continued to drop for at least three pressure readings.

13. The method of claim 1 further comprising:
detecting changes in the hydraulic pressure by:
periodically acquiring measurements of the hydraulic pressure; and
calculating changes between consecutively acquired measurements.

14. The method of claim 13 wherein:
measurements of hydraulic pressure are periodically acquired between five and twenty milliseconds apart.

15. The method of claim 1 wherein:
reducing the hydraulic pressure comprises instructing a hydraulic motor that drives a hydraulic cylinder of the tool to operate in reverse.

16. The method of claim 15 further comprising:
retracting the hydraulic cylinder to a default position.

17. The method of claim 1 wherein:
confirming the state is based on changes in the hydraulic pressure during a return cycle.

18. The method of claim 17 wherein:
the changes in the hydraulic pressure indicate the ejection of a collar from a swage nose of the tool.

19. The method of claim 17 wherein:
the changes in the hydraulic pressure during the return cycle include a drop by more than a threshold amount for more than a predetermined period of time.

20. A method for controlling hydraulic pressure at a swage tool, the method comprising:
detecting amounts of pressure change over time in a hydraulic system that drives a tool; and
in response to monitoring hydraulic pressure:
automatically instructing the hydraulic system to reduce pressure in response to confirming that a fastener has been fully installed by the tool based on amounts of additionally detected pressure change indicating decreases in pressure;
awaiting another determination that pressure in the hydraulic system has decreased at a greater rate than a threshold rate in response to determining that the fastener has not been fully installed by the tool based on additionally detected pressure changes; and
confirming a state of the fastener based on additional monitoring of hydraulic pressure.

\* \* \* \* \*